US012208042B2

(12) United States Patent
Garfoot et al.

(10) Patent No.: US 12,208,042 B2
(45) Date of Patent: Jan. 28, 2025

(54) PATIENT TRANSPORT APPARATUS HAVING AN EXTENDER FOR A HEAD DECK SECTION

(71) Applicant: Stryker Corporation, Kalamazoo, MI (US)

(72) Inventors: Bryan E. Garfoot, Portage, MI (US); Trey Thomas Pfeiffer, Portage, MI (US)

(73) Assignee: Stryker Corporation, Portage, MI (US)

( * ) Notice: Subject to any disclaimer, the term of this patent is extended or adjusted under 35 U.S.C. 154(b) by 225 days.

(21) Appl. No.: 17/953,675

(22) Filed: Sep. 27, 2022

(65) Prior Publication Data

US 2023/0095554 A1 Mar. 30, 2023

Related U.S. Application Data

(60) Provisional application No. 63/249,663, filed on Sep. 29, 2021.

(51) Int. Cl.

| | |
|---|---|
| ***A61G 7/07*** | (2006.01) |
| ***A61G 7/05*** | (2006.01) |
| ***A61G 13/12*** | (2006.01) |

(52) U.S. Cl.

CPC ........... *A61G 7/072* (2013.01); *A61G 7/0507* (2013.01); *A61G 13/121* (2013.01); *A61G 7/07* (2013.01)

(58) Field of Classification Search

CPC ........ A61G 7/072; A61G 7/07; A61G 7/0507; A61G 13/121

(Continued)

(56) References Cited

U.S. PATENT DOCUMENTS 955,094 A * 4/1910 McNeel ................. B60N 2/874 297/410
3,477,761 A * 11/1969 Krantz ..................... A47C 7/38 297/410

(Continued)

FOREIGN PATENT DOCUMENTS

DE 202015003259 U1 8/2016
DE 102010032533 B4 8/2018

(Continued)

OTHER PUBLICATIONS

English language abstract and machine-assisted English translation for DE 10 2010 032 533 B4 extracted from espacenet.com database on May 9, 2024, 6 pages.

(Continued)

*Primary Examiner* — Robert G Santos
(74) *Attorney, Agent, or Firm* — Howard & Howard Attorneys PLLC

(57) ABSTRACT

A patient transport apparatus including a base, an intermediate frame, a support deck with a fowler section, and a deck extension assembly with a head deck section, a brace extending between a mount end and a coupling end, and a pivot coupling attached to the coupling end and supporting the head deck section. A mount operatively attached to the fowler section defines a receiver slidably supporting the brace adjacent to the mount end for movement along a brace axis. A retainer interposed between the mount and the brace selectively retains the brace in one of a plurality of extension positions and is operable between: a retained configuration to prevent movement, and a released configuration to permit movement of the brace between the extension positions. Operation changes from the retained configuration to the released configuration in response to force applied to the head deck section along the brace axis.

20 Claims, 17 Drawing Sheets

(58) Field of Classification Search
USPC ........................................................ 5/622, 621
See application file for complete search history.

(56) References Cited

U.S. PATENT DOCUMENTS

| | | | | |
|---|---|---|---|---|
| 3,606,302 | A | 9/1971 | Allard et al. | |
| 3,853,350 | A | 12/1974 | Leffler | |
| 3,921,231 | A | 11/1975 | Bourgraf et al. | |
| 4,131,802 | A | 12/1978 | Braden et al. | |
| 4,432,359 | A | 2/1984 | James | |
| 4,453,768 | A | 6/1984 | Cranford, Jr. et al. | |
| 4,813,088 | A | 3/1989 | DiMatteo et al. | |
| 4,989,836 | A | 2/1991 | Hudson, III et al. | |
| 5,074,574 | A | 12/1991 | Carwin | |
| 5,177,823 | A * | 1/1993 | Riach | A61G 15/125 5/636 |
| 5,276,927 | A * | 1/1994 | Day | A61B 90/14 5/601 |
| 5,427,436 | A * | 6/1995 | Lloyd | A61G 13/121 297/409 |
| 5,661,859 | A | 9/1997 | Schaefer | |
| 5,926,876 | A | 7/1999 | Haigh et al. | |
| 6,076,208 | A | 6/2000 | Heimbrock et al. | |
| 6,202,230 | B1 * | 3/2001 | Borders | A61G 13/08 5/624 |
| 6,250,716 | B1 * | 6/2001 | Clough | A47C 7/383 297/391 |
| 6,276,012 | B2 | 8/2001 | Borders | |
| 6,446,287 | B2 * | 9/2002 | Borders | A61G 13/12 5/624 |
| 6,460,207 | B1 | 10/2002 | Papay et al. | |
| 6,477,728 | B1 | 11/2002 | Faz | |
| 6,539,560 | B1 | 4/2003 | Grieco et al. | |
| 6,681,426 | B2 | 1/2004 | Heimbrock et al. | |
| 6,893,096 | B2 | 5/2005 | Bonn et al. | |
| 6,934,987 | B2 | 8/2005 | Newkirk et al. | |
| 7,080,420 | B2 | 7/2006 | Damron | |
| 7,117,551 | B1 | 10/2006 | Dinkler, II et al. | |
| 7,240,966 | B2 | 7/2007 | Stone et al. | |
| 7,398,571 | B2 | 7/2008 | Souke et al. | |
| 7,424,759 | B2 | 9/2008 | Damron | |
| 7,448,686 | B2 | 11/2008 | Hersh | |
| 7,610,639 | B2 | 11/2009 | Roleder et al. | |
| 7,699,265 | B2 | 4/2010 | Mastrolia | |
| 7,878,452 | B2 | 2/2011 | Mastrolia | |
| 7,979,933 | B2 | 7/2011 | Roleder et al. | |
| 8,191,830 | B2 | 6/2012 | Mastrolia | |
| 8,382,181 | B2 | 2/2013 | Bourgraf et al. | |
| 8,936,305 | B1 | 1/2015 | Skursky | |
| 9,095,489 | B2 | 8/2015 | Berry et al. | |
| 9,486,373 | B2 | 11/2016 | Lambarth et al. | |
| 9,782,317 | B2 | 10/2017 | Mount | |
| 10,045,894 | B2 | 8/2018 | Magill et al. | |
| 10,071,010 | B2 | 9/2018 | Bailey | |
| 10,987,268 | B2 | 4/2021 | Souke et al. | |
| 11,571,349 | B2 | 2/2023 | Johnson et al. | |
| 2001/0000363 | A1 * | 4/2001 | Borders | A61G 13/0009 5/618 |
| 2002/0000008 | A1 * | 1/2002 | Borders | A61G 13/12 5/622 |
| 2004/0046435 | A1 * | 3/2004 | Bonn | A47C 7/38 297/409 |
| 2006/0053557 | A1 * | 3/2006 | Damron | A61G 13/121 5/636 |
| 2006/0225214 | A1 * | 10/2006 | Damron | A61G 13/12 5/640 |
| 2007/0089238 | A1 | 4/2007 | Kramer et al. | |
| 2018/0303689 | A1 | 10/2018 | Souke et al. | |
| 2019/0388285 | A1 | 12/2019 | Lambarth et al. | |
| 2021/0236356 | A1 | 8/2021 | Cohen Gazit et al. | |
| 2021/0353476 | A1 | 11/2021 | Lafleche et al. | |
| 2023/0095554 | A1 * | 3/2023 | Garfoot | A61G 1/04 5/622 |
| 2023/0320916 | A1 | 10/2023 | Hirschbeck | |

FOREIGN PATENT DOCUMENTS

| | | | | |
|---|---|---|---|---|
| DE | 102015208427 | B4 | 9/2018 | |
| DE | 202020102738 | U1 | 8/2020 | |
| DE | 202020102741 | U1 | 8/2020 | |
| DE | 202020102742 | U1 | 8/2020 | |
| DE | 202020102743 | U1 | 8/2020 | |
| EP | 1028685 | B1 * | 4/2005 | A61B 6/0457 |
| EP | 1525870 | A2 * | 4/2005 | A61B 6/0457 |
| EP | 2841042 | B1 | 6/2017 | |
| EP | 3738568 | A1 | 11/2020 | |
| EP | 3988069 | B1 | 9/2023 | |
| WO | WO-9406391 | A1 * | 3/1994 | A61B 90/14 |
| WO | WO-9923991 | A1 * | 5/1999 | A61B 6/0457 |
| WO | 2013158580 | A2 | 10/2013 | |
| WO | 2018210863 | A1 | 11/2018 | |
| WO | 2022198276 | A1 | 9/2022 | |

OTHER PUBLICATIONS

Machine-assisted English language abstract and machine-assisted English translation for DE 10 2015 208 427 B4 extracted from espacenet.com database on May 9, 2024, 16 pages.

Machine-assisted English language abstract and machine-assisted English translation for DE 20 2015 003 259 U1 extracted from espacenet.com database on May 9, 2024, 13 pages.

Machine-assisted English language abstract and machine-assisted English translation for DE 20 2020 102 738 U1 extracted from espacenet.com database on May 9, 2024, 56 pages.

Machine-assisted English language abstract and machine-assisted English translation for DE 20 2020 102 741 U1 extracted from espacenet.com database on May 9, 2024, 54 pages.

Machine-assisted English language abstract and machine-assisted English translation for DE 20 2020 102 742 U1 extracted from espacenet.com database on May 9, 2024, 54 pages.

Machine-assisted English language abstract and machine-assisted English translation for DE 20 2020 102 743 U1 extracted from espacenet.com database on May 9, 2024, 55 pages.

Machine-assisted English language abstract and machine-assisted English translation for EP 3 738,568 A1 extracted from espacenet.com database on May 9, 2024, 53 pages.

English language abstract and machine-assisted English translation for WO 2018/210863 A1 extracted from espacenet.com database on Apr. 25, 2024, 24 pages.

Stryker, "Emergency Care Catalog", MTX850 EN Rev. 1, https://www.stryker.com/content/dam/stryker/ems/products/smrt-power-system/resources/eu/Stryker-patient-transport-catalog.pdf, 2019, 12 pages.

* cited by examiner

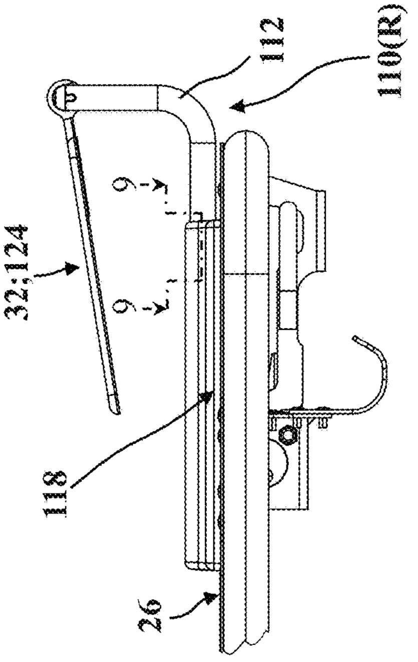
FIG. 9B
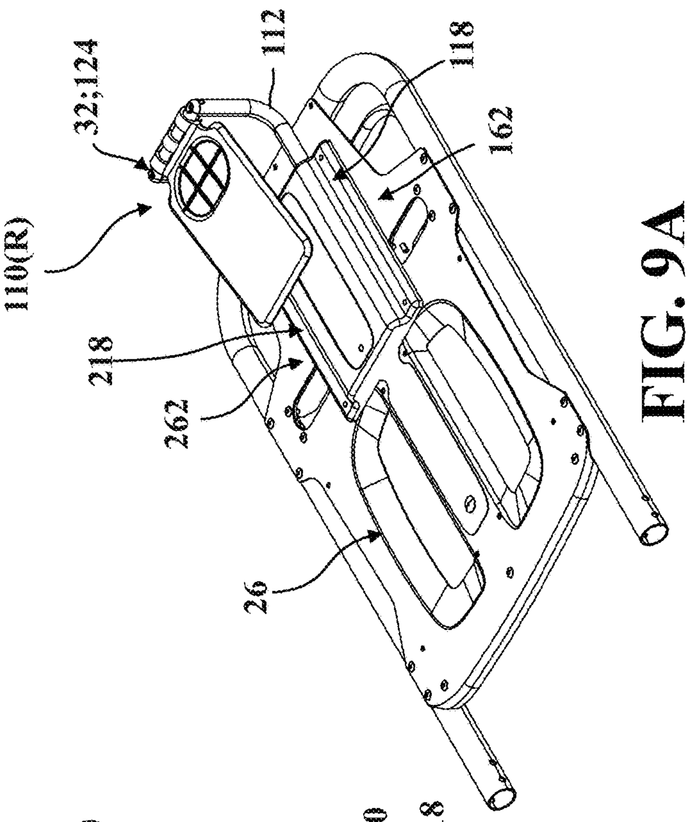
FIG. 9A
FIG. 9C
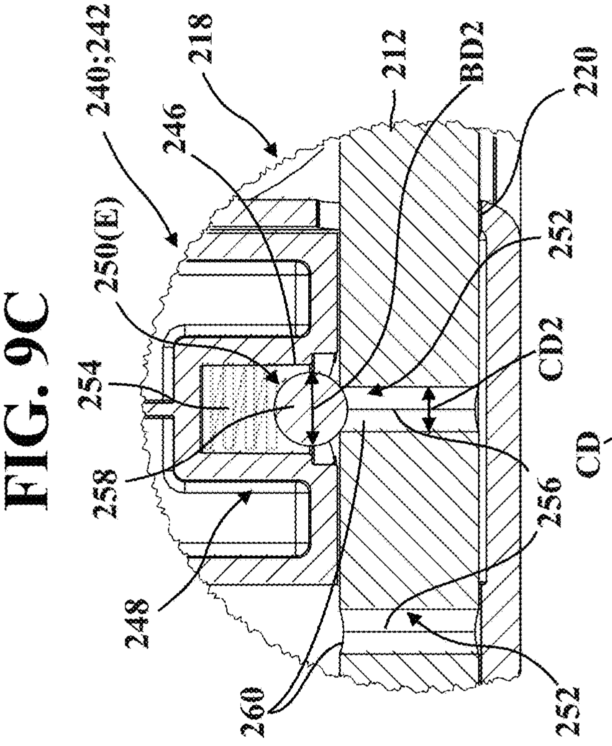
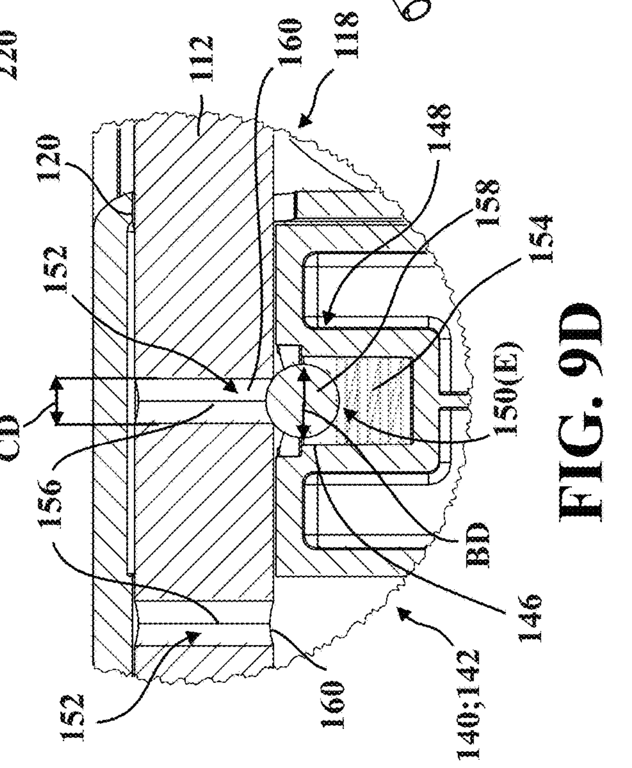
FIG. 9D

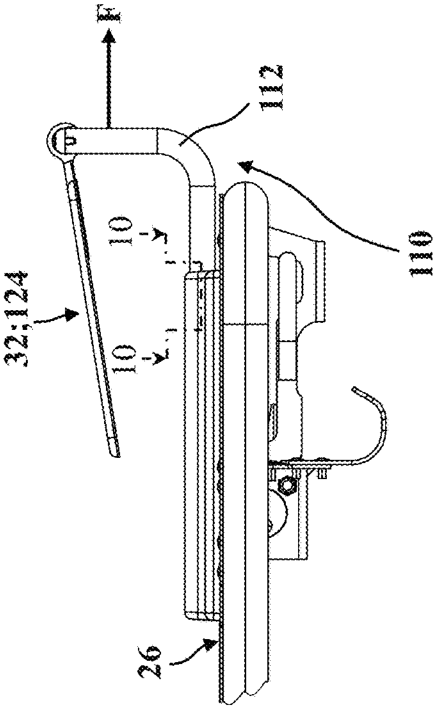
FIG. 10B
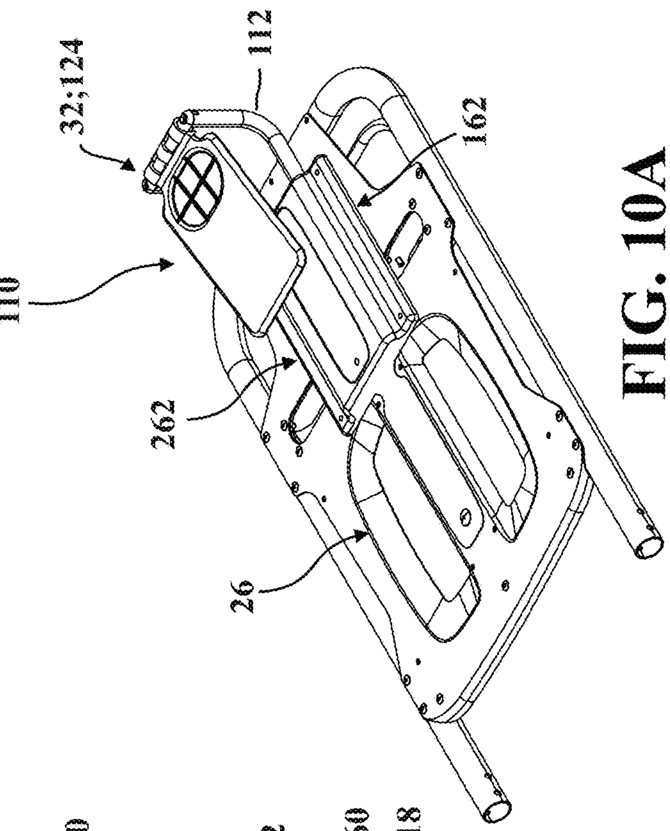
FIG. 10A
FIG. 10C
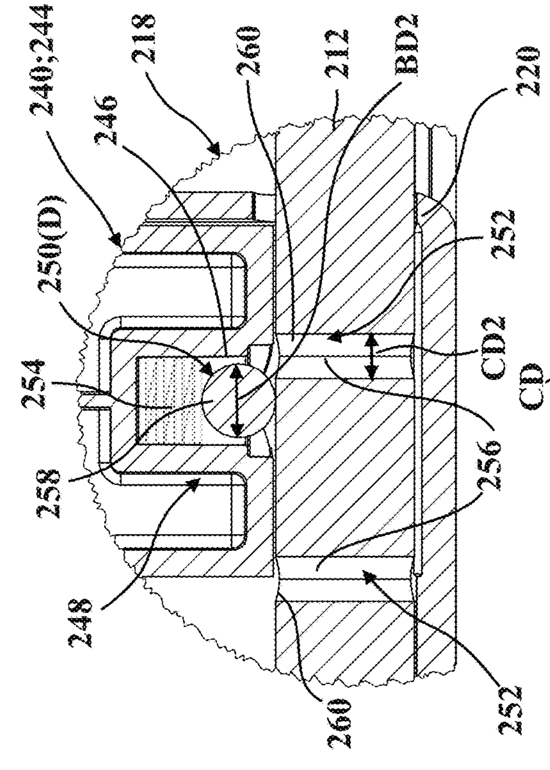
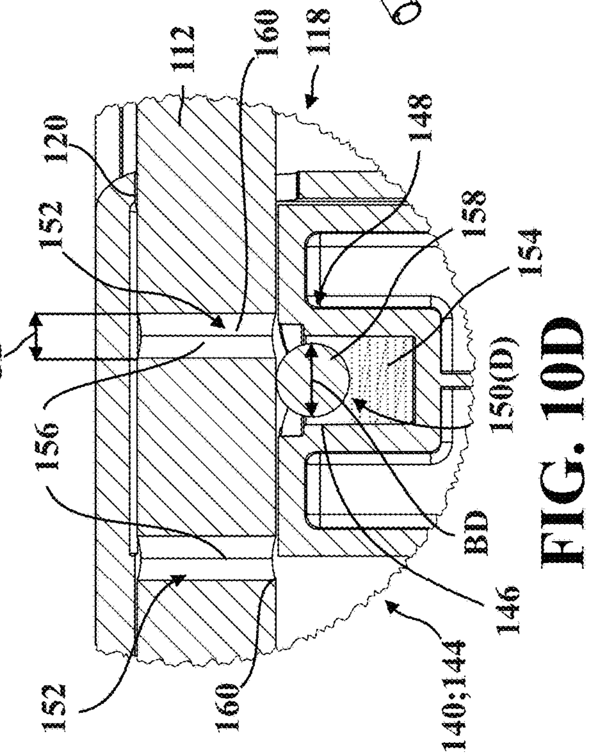
FIG. 10D

32;124
112
118
162
110
218
262
26
F
11
240;244
246
250(D)
BD2
254
258
248
260
212
252
CD2
220
256
152
160
CD
156
120
148
158
154
150(D)
BD
146
140;144

PATIENT TRANSPORT APPARATUS HAVING AN EXTENDER FOR A HEAD DECK SECTION

CROSS-REFERENCE TO RELATED APPLICATION

The subject patent application claims priority to and all the benefits of U.S. Provisional Patent Application No. 63/249,663, filed on Sep. 29, 2021, the disclosure of which is hereby incorporated by reference in its entirety.

BACKGROUND

Patient support systems facilitate care of patients in a health care setting. Patient support systems comprise patient transport apparatuses such as, for example, hospital beds, stretchers, cots, tables, wheelchairs, and chairs. A conventional patient transport apparatus generally includes a base and an intermediate frame upon which the patient is supported via one or more deck sections such as a seat section, a fowler section, and the like.

Depending on various factors such as the height of the patient and their relative position about the deck sections, it can be desirable to provide additional support to the patient. For example, with a relatively tall patient, it may be desirable for the fowler section to be larger to provide comfortable support to the patient's head. To this end, certain patient transport apparatuses known in the art may employ adjustable length fowler sections or additional "modular" sections that can be removably attached to the fowler section. However, such solutions tend to be relatively expensive and can be difficult to use, deploy, and/or store if needed. Accordingly, there remains a need in the art to provide patients with improved support in patient transport settings.

SUMMARY

The present disclosure provides patient transport apparatus with a base; an intermediate frame; a patient support deck defining a patient support surface, the patient support deck including a fowler deck section operatively attached to the intermediate frame; and a deck extension assembly including: a head deck section, a brace extending between a mount end and a coupling end, a pivot coupling operatively attached to the coupling end and supporting the head deck section for selective pivoting movement relative to the brace, a mount operatively attached to the fowler deck section and defining a receiver slidably supporting the brace adjacent to the mount end for movement along a brace axis between a plurality of extension positions, and a retainer interposed between the mount and the brace to selectively retain the brace in one of the plurality of extension positions, the retainer being operable between: a retained configuration to prevent relative movement between the mount and the brace, and a released configuration to permit movement of the brace relative to the mount between the plurality of extension positions, where operation of the retainer changes from the retained configuration to the released configuration in response to force applied to the head deck section in a direction along the brace axis.

The present disclosure also provides a patient transport apparatus with a base; an intermediate frame; a patient support deck defining a patient support surface, the patient support deck including a fowler deck section operatively attached to the intermediate frame; and a deck extension assembly including: a first brace extending between a first mount end and a first coupling end, a second brace extending between a second mount end and a second coupling end, a head deck section operatively attached to the first coupling end of the first brace and the second coupling end of the second brace, a first mount operatively attached to the fowler deck section at a first lateral portion of the fowler deck section and defining a first receiver slidably supporting the first brace adjacent to the first mount end for movement along a first brace axis between a plurality of extension positions, a second mount operatively attached to the fowler deck section at a second lateral portion of the fowler deck section, opposite the first lateral portion, and defining a second receiver slidably supporting the second brace adjacent to the second mount end for movement along a second brace axis between the plurality of extension positions, a first retainer interposed between the first mount and the first brace to selectively retain the first brace in one of the plurality of extension positions, the first retainer being operable between: a first retained configuration to prevent relative movement between the first mount and the first brace, and a first released configuration to permit movement of the first brace relative to the first mount between the plurality of extension positions, and a second retainer interposed between the second mount and the second brace to selectively retain the second brace, the second retainer being operable between: a second retained configuration to prevent relative movement between the second mount and the second brace, and a second released configuration to permit movement of the second brace relative to the second mount, where operation of the first retainer and the second retainer changes from the first and second retained configurations, respectively, to the first and second released configurations, respectively, in response to force applied to the head deck section in a direction along the first and second brace axes.

BRIEF DESCRIPTION OF THE DRAWINGS

Advantages of the present disclosure will be readily appreciated as the same becomes better understood by reference to the following detailed description when considered in connection with the accompanying drawings, wherein:

FIG. 9A is a perspective view of the deck extension assembly in a retracted configuration.

FIG. 9B is a partial side view of the deck extension assembly of FIG. 9A.

FIG. 9C is a partial section view of the deck extension assembly of FIG. 9A that is sectioned to reveal a configuration of a second retainer in a second retained configuration.

FIG. 9D is a partial section view of the deck extension assembly of FIG. 9A, taken along line 9-9 in FIG. 9B, that is sectioned to reveal a configuration of a first retainer in a first retained configuration.

FIG. 10A is a perspective view of the deck extension assembly in an intermediate configuration.

FIG. 10B is a partial side view of the deck extension assembly of FIG. 10A.

FIG. 10C is a partial section view of the deck extension assembly of FIG. 10A that is sectioned to reveal a configuration of a second retainer in a second released configuration.

FIG. 10D is a partial section view of the deck extension assembly of FIG. 10A, taken along line 10-10 in FIG. 10B, that is sectioned to reveal a configuration of a first retainer in a first released configuration.

DETAILED DESCRIPTION

Figure 1:
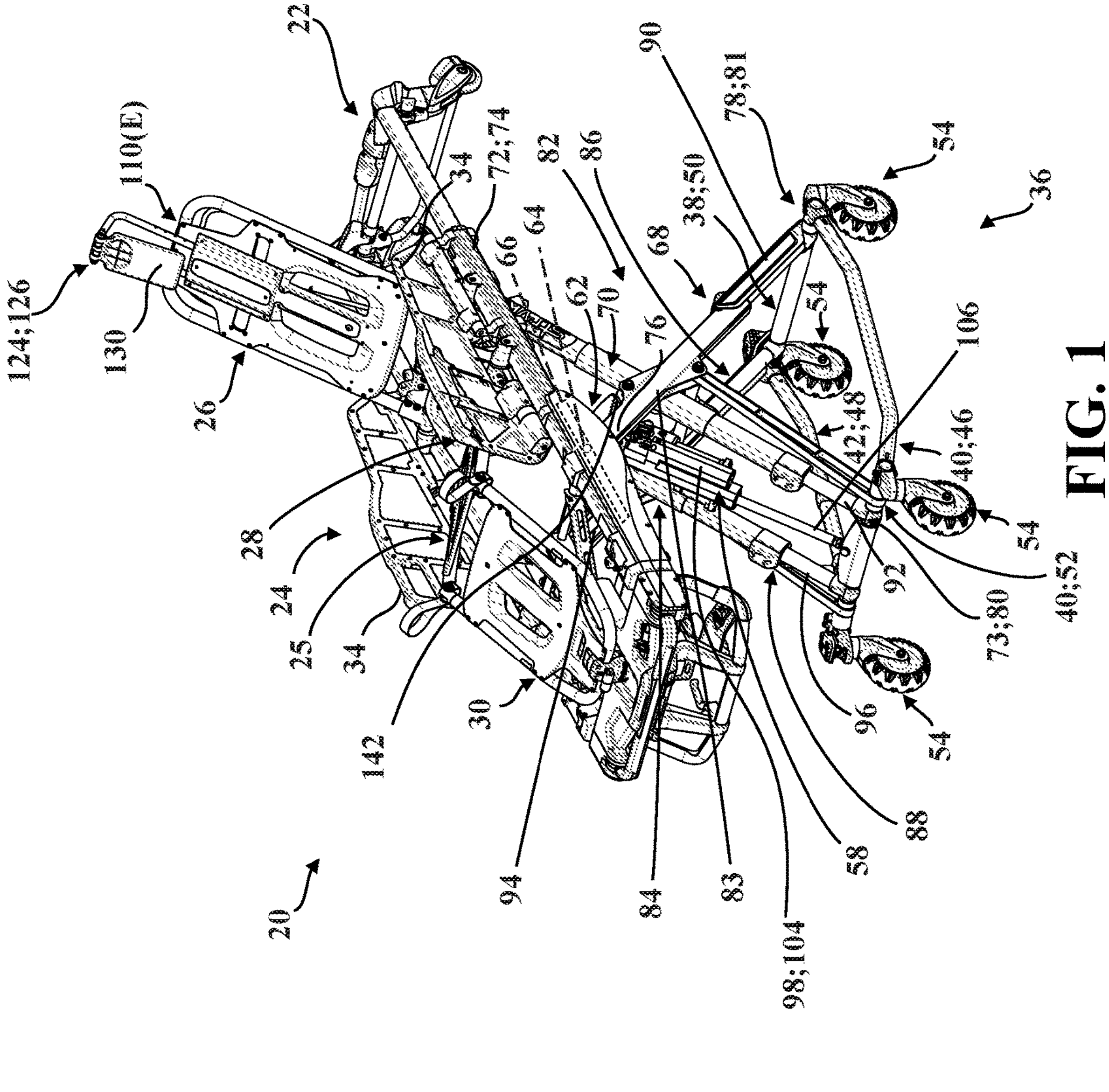
FIG. 1 is a perspective view of a patient transport apparatus including a deck extension assembly in an extended configuration.
Figure 2:
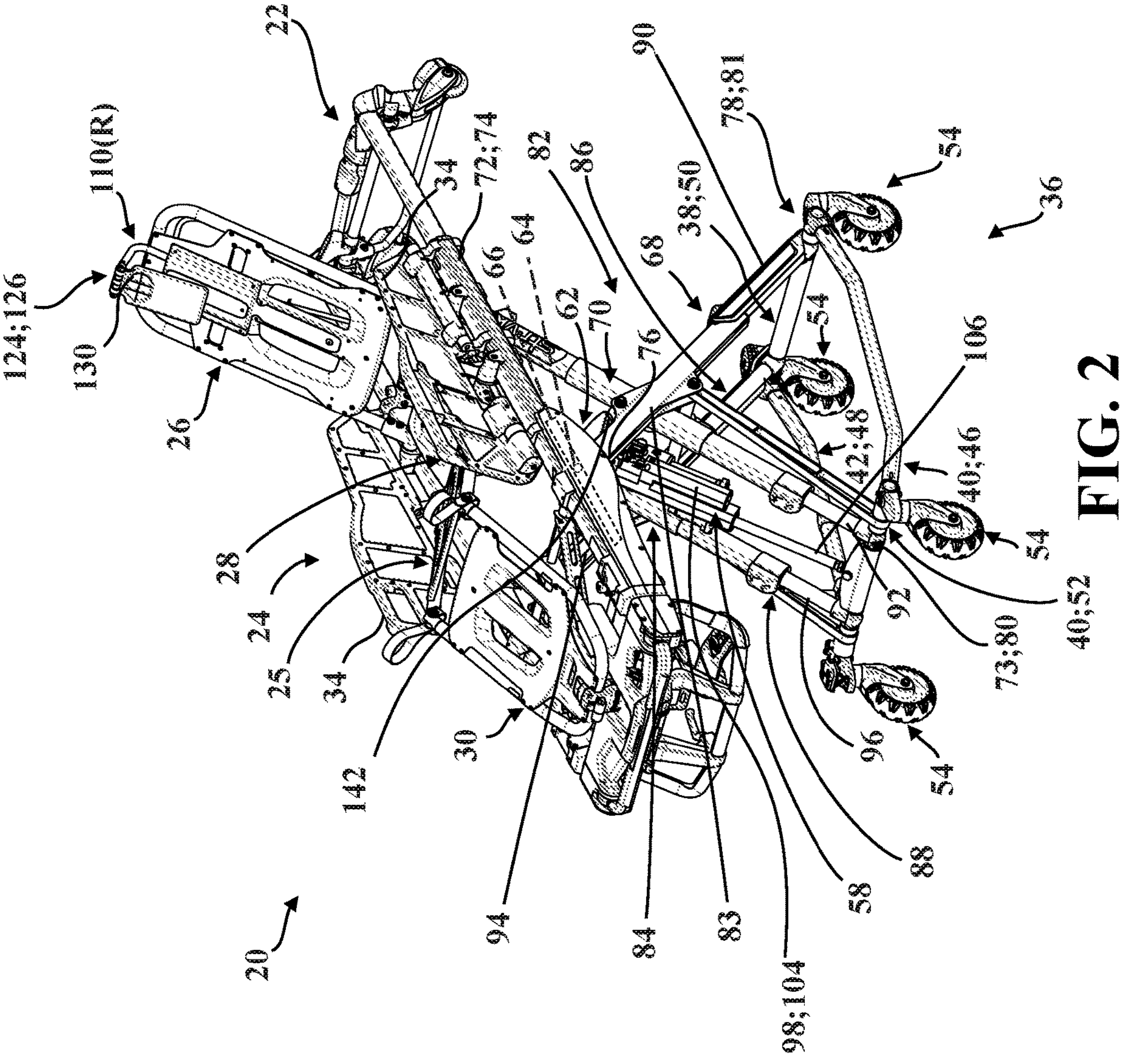
FIG. 2 is a perspective view of the patient transport apparatus including the deck extension assembly in a retracted configuration and a pivot coupling in a headrest configuration.
Figure 3:
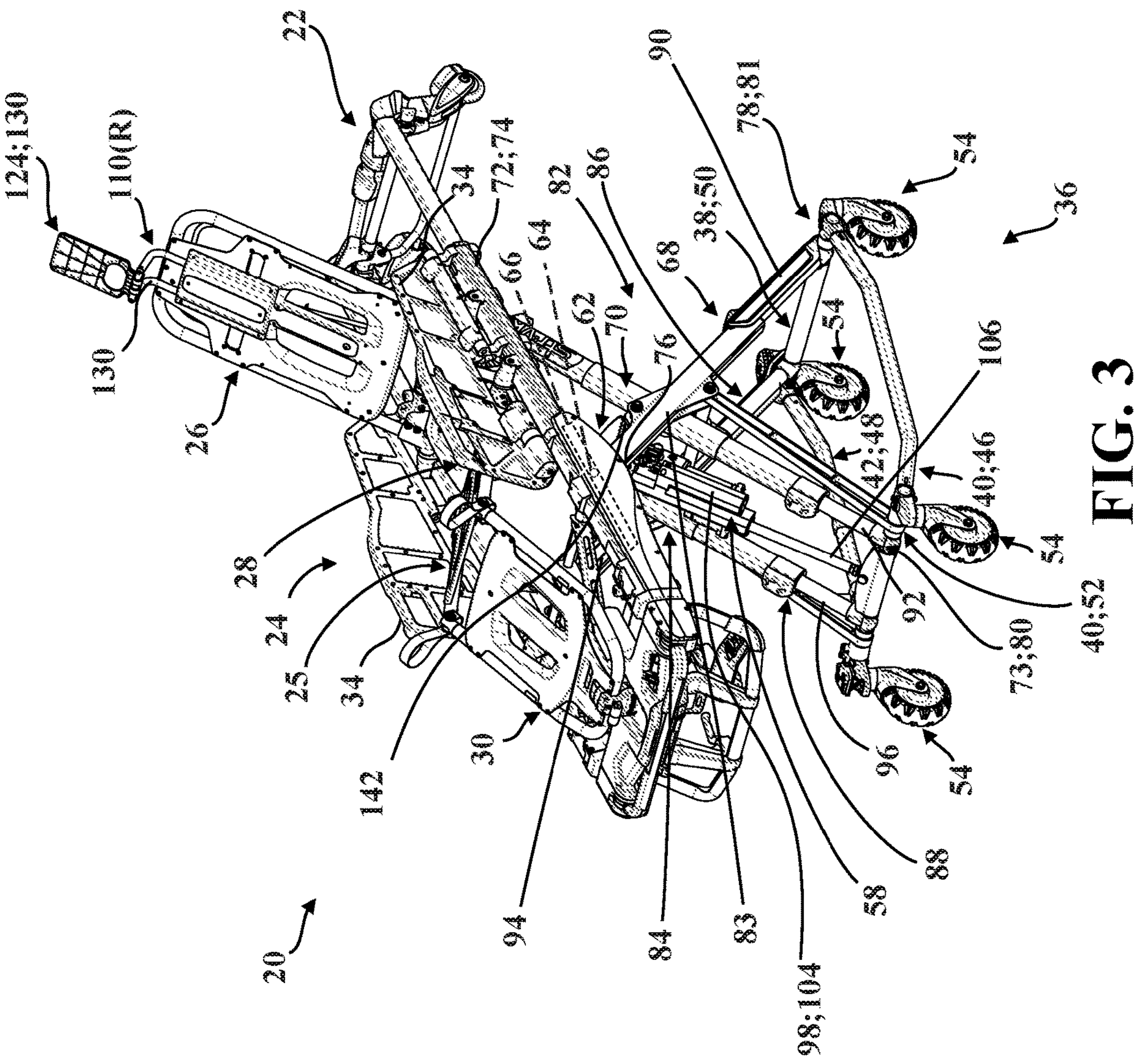
FIG. 3 is a perspective view of the patient transport apparatus including the deck extension assembly in the retracted configuration and the pivot coupling in a backward configuration.

Referring to FIGS. 1-3, a patient transport apparatus 20 is shown for supporting a patient in a health care and/or transportation setting. The patient transport apparatus 20 illustrated in FIGS. 1-2 includes a cot. In other versions, however, the patient transport apparatus 20 may include a hospital bed, stretcher, table, wheelchair, chair, or similar apparatus utilized in the transportation and care of a patient.

As shown in FIGS. 1-3, the patient transport apparatus 20 includes an intermediate frame 22 configured to support the patient. The intermediate frame 22 can be like that shown in U.S. Patent Application Publication No. 2018/0303689 A1, which claims priority to U.S. Provisional Patent Application No. 62/488,441, filed on Apr. 21, 2017, entitled, "Emergency Cot With A Litter Height Adjustment Mechanism," the disclosures of which are hereby incorporated by reference in their entirety.

The intermediate frame 22 may be coupled to a variety of components that aid in supporting and/or transporting the patient. For example, in FIGS. 1-3, the intermediate frame 22 is coupled to a patient support deck 24 defining a patient support surface 25 upon which the patient directly rests. The patient support deck 24 may be defined by one or more articulable deck sections, for example, a fowler deck section 26, a seat deck section 28, a leg deck section 30, and a head deck section 32, to facilitate care and/or transportation of the patient in various patient positions. In some versions, various types of mattresses, pads, cushions, and the like (not shown in detail) may be operatively attached to the patient support deck 24 to support the patient. For example, a head cushion 33 may be operatively attached to the head deck section 32 (see FIGS. 5-8).

The intermediate frame 22 may also be coupled to hand rails 34. In FIG. 1, the hand rails 34 extend from opposing sides of the intermediate frame 22 and provide egress barriers for the patient on the patient support deck 24. The hand rails 34 may also be utilized by an individual, such as a caregiver, an emergency medical technician (EMT), or another medical professional, to move or manipulate the patient transport apparatus 20. In some versions, the hand rails 34 may include a hinge, pivot, or similar mechanism to allow the hand rails 34 to be folded or stored adjacent to or below the patient support deck 24.

The patient transport apparatus 20 may include a base 36. As shown in FIGS. 1-3, the base 36 may include two opposing lateral base sides 38, 40 coupled to two opposing longitudinal base sides 42, 44. As shown in FIGS. 1-3, the longitudinal base sides 42, 44 may include longitudinally-extending rails 46, 48 and the lateral base sides 38, 40 may include crosswise-extending rails 50, 52 which may be coupled at the ends thereof to the rails 46, 48.

The base 36 may further include a plurality of caster wheel assemblies 54 operatively connected adjacent to each corner of the base 36 defined by the longitudinally-extending rails 46, 48 and the crosswise-extending rails 50, 52. As such, the patient transport apparatus 20 of FIGS. 1-3 may include four caster wheel assemblies 54. The wheel assemblies 54 may be configured to swivel to facilitate turning of the patient transport apparatus 20. The wheel assemblies 54 may include a swivel locking mechanism to prevent the wheel assemblies 54 from swiveling when engaged. The wheel assemblies 54 may also include wheel brakes 56 to prevent rotation of the wheel.

The patient transport apparatus 20 may also include a lift mechanism 58 interposed between the base 36 and the intermediate frame 22. The lift mechanism 58 may be configured to move between a plurality of vertical configurations including an extended configuration where the intermediate frame 22 is elevated relative to the base 36, as shown in FIGS. 1-3, and a retracted configuration (not shown) where the intermediate frame 22 is lowered such that it is in closer proximity to the base 36. The lift mechanism 58 can be like that shown in the U.S. Patent Application Publication No. 2018/0303689 A1.

While moving between the plurality of vertical configurations, the lift mechanism 58 may move either the base 36 or the intermediate frame 22 relative to the other of the intermediate frame 22 or the base 36 depending on how the patient transport apparatus 20 is supported during use. For example, the patient transport apparatus 20 may be supported at the intermediate frame 22 when the patient transport apparatus 20 is being unloaded/loaded into an emergency response vehicle (not shown) and the patient transport apparatus 20 may be supported at the base 36 when the patient transport apparatus 20 is resting on a surface 60 (shown in FIGS. 1-3). In instances where the patient transport apparatus 20 is supported at the intermediate frame 22, the lift mechanism 58, while moving between the plurality of vertical configurations, moves the base 36 relative to the intermediate frame 22. In instances where the patient transport apparatus 20 is supported at the base 36, the lift mechanism 58, while moving between the plurality of vertical configurations, moves the intermediate frame 22 relative to the base 36.

The patient transport apparatus 20 may include a variety of components that allow the lift mechanism 58 to move between the plurality of vertical configurations. For example, in the version of FIGS. 1-3, the patient transport apparatus 20 includes a bracket 62 and a slidable member 64, the slidable member 64 being disposed within a channel 66 of the bracket 62 and being moveable between a plurality of different positions in the channel 66. The bracket 62 may be coupled to a variety of locations on the patient transport apparatus 20. For example, referring to the version of FIGS. 1-3, the bracket 62 may be coupled to the intermediate frame 22. In some examples, the bracket 62 may be coupled to an underside of the intermediate frame 22. In other examples, however, the bracket 62 may be coupled to a different location on the patient transport apparatus 20. For instance, the bracket 62 may be coupled to a side of the intermediate frame 22. In another example, the bracket 62 may be coupled to the patient support deck 24. Furthermore, while a single bracket 62 is shown as being coupled to the intermediate frame 22 in FIGS. 1-3, another bracket 62 may be coupled to the intermediate frame 22. For example, another bracket 62 may also be coupled to an underside of the intermediate frame 22.

The channel 66 may have various configurations and shapes, e.g., straight, zig-zag, S-shaped, curved, diagonal/sloped, or any combination thereof. In other versions, the channel 66 may have a non-linear shape, a piecewise shape, a curvilinear shape, or any combination of linear or non-linear shapes. The bracket 62 and the channel 66 can be like that shown in U.S. Patent Application Publication No. 2018/0303689 A1.

As previously stated, the patient transport apparatus 20 includes a slidable member 64, which is disposed in the channel 66 and is moveable between a plurality of different positions in the channel 66. Here, as the slidable member 64 moves between the plurality of different positions within the channel 66, the lift mechanism 58 moves between the plurality of vertical configurations. In this way, each position of the slidable member 64 in the channel 66 corresponds to a vertical configuration of the lift mechanism 58. For example, in the extended configuration of FIGS. 1-3, the slidable member 64 is positioned near a first end of the channel 66. In the retracted configuration (not shown), the slidable member 64 is positioned closer to a second end of the channel 66. The slidable member 64 can be like that shown in U.S. Patent Application Publication No. 2018/0303689 A1.

In FIG. 1, the lift mechanism 58 includes a first frame member 68 and a second frame member 70, both of which are coupled to the intermediate frame 22 and the base 36. A first end 72 of the second frame member 70 may be pivotally coupled to the head-end of the intermediate frame 22 at a connection point 74 such that the second frame member 70 may pivot about the connection point 74. A second end 73 of the second frame member 70 may be pivotally coupled to a foot-end of the base 36 at a connection point 80 such that the second frame member 70 may pivot about the connection point 80. Furthermore, a first end 76 of the first frame member 68 may be pivotally coupled to a foot-end of the intermediate frame 22 via the slidable member 64. More specifically stated, and as shown in FIGS. 1-3, the first end 76 may be pivotally coupled to the slidable member 64, which is disposed in the channel 66 of the bracket 62, which is coupled to the intermediate frame 22.

As such, the first frame member 68 is pivotally coupled to the intermediate frame 22 and may pivot about the slidable member 64. Also shown, a second end 78 of the first frame member 68 may be pivotally coupled to a head-end of the base 36 at a connection point 81 such that the first frame member 68 may pivot about the connection point 81. Furthermore, the first frame member 68 and the second frame member 70 may be pivotally coupled to each other at the pivot axle 83 to form an "X" frame 82.

The lift mechanism 58 may include a second, similarly constructed X frame 84, which may include a third frame member 86 and a fourth frame member 88. Similar to X frame 82, the third frame member 86 and the fourth frame member 88 of X frame 84 may be pivotally coupled to a side of the intermediate frame 22 and a side of the base 36. For example, the third frame member 86 and the fourth frame member 88 of X frame 84 may be pivotally coupled to a side of the intermediate frame 22 and a side of the base 36, which oppose a side of the intermediate frame 22 and a side of the base 36 to which the first frame member 68 and the second frame member 70 are coupled. In one such version, as shown in FIGS. 1-3, X frame 84 is coupled to the intermediate frame 22 and to the base 36, and X frame 82 is coupled to the intermediate frame 22 and to the base 36. It will be appreciated that any reference herein to the first frame member 68 may also be a reference to the third frame member 86. Similarly, any reference to the second frame member 70 may also be a reference to the fourth frame member 88.

In FIG. 1, the frame members 68, 70, 86, 88 are hollow and telescopingly include further frame members 90, 92, 94, 96, respectively. Further frame members 90, 92, 94, 96 are supported for movement into and out of the respective frame members 68, 70, 86, 88 to extend a length of the respective frame members 68, 70, 86, 88. In the version shown in FIGS. 1-3, the further frame members 90, 92, 94, 96 extend out of frame members 68, 70, 86, 88 toward the base 36. However, in other examples, the further frame members 90, 92, 94, 96 may extend out of frame members 68, 70, 86, 88 toward the intermediate frame 22. In these examples, frame members 68, 70, 86, 88 are coupled to the base 36 or the intermediate frame 22 via further frame members 90, 92, 94, 96. However, in other examples, the frame members 68, 70, 86, 88 may be of a fixed length and exclude further frame members 90, 92, 94, 96.

Additionally, while the lift mechanism 58 of the representative version illustrated in FIG. 1 includes four frame members 68, 70, 86, 88, the lift mechanism 58 may include any suitable number of frame members.

As previously stated, the slidable member 64 is coupled to the first end 76 of the first frame member 68 and, therefore, the first end 76 of the first frame member 68 and the slidable member 64 may be integrally moveable along the length of the channel 66. As such, as the slidable member 64 moves between the plurality of positions in the channel 66, the lift mechanism 58 moves between the plurality of vertical configurations, which correspond to the position of the slidable member 64.

Those having ordinary skill in the art will appreciate that the lift mechanism 58 may move between the plurality of vertical configurations due to a patient care provider applying a manual action to the lift mechanism 58, or components thereof. Additionally, or alternatively, the patient transport apparatus 20 may include one or more actuators 98, which may be coupled to any suitable component of the lift mechanism 58 and may be configured to move the lift mechanism 58 between the plurality of vertical configurations. As shown in FIGS. 1-3, the illustrated actuator 98 is realized as a hydraulic linear actuator, which is connected to and extends between the respective brackets 100 and 102. In this particular version, the hydraulic linear actuator includes a cylindrical housing 104 fastened to the bracket 102, the cylindrical housing 104 including a reciprocal rod 106 having a piston (not shown) located within the cylindrical housing 104. The distal end of the reciprocal rod 106 is connected by a joint 108 to the bracket 100. The joint 108 allows pivotal movement about two orthogonally related axes. Extension and retraction of the reciprocal rod 106 will facilitate movement of the frame members 68, 86 of the lift mechanism 58 about the axis of the reciprocal rod 106.

The actuator 98 is further described in U.S. Pat. No. 7,398,571, filed on Jun. 30, 2005, entitled, "Ambulance Cot and Hydraulic Elevating Mechanism Therefor," the disclosure of which is hereby incorporated by reference in its entirety. Furthermore, techniques for utilizing actuator 98 to manipulate the components of the patient transport apparatus 20 can be like those described in U.S. Patent Application Publication No. 2018/0303689 A1.

In some versions, the actuator 98 may not be the hydraulic linear actuator shown in FIG. 1. The actuator 98 may be any actuator suitable for actuating the lift mechanism 58 such that the lift mechanism 58 moves between the plurality of vertical configurations. For example, the actuator 98 may be an electric motor, a servo motor, a pneumatic actuator, or any other suitable actuator.

Figure 4A:
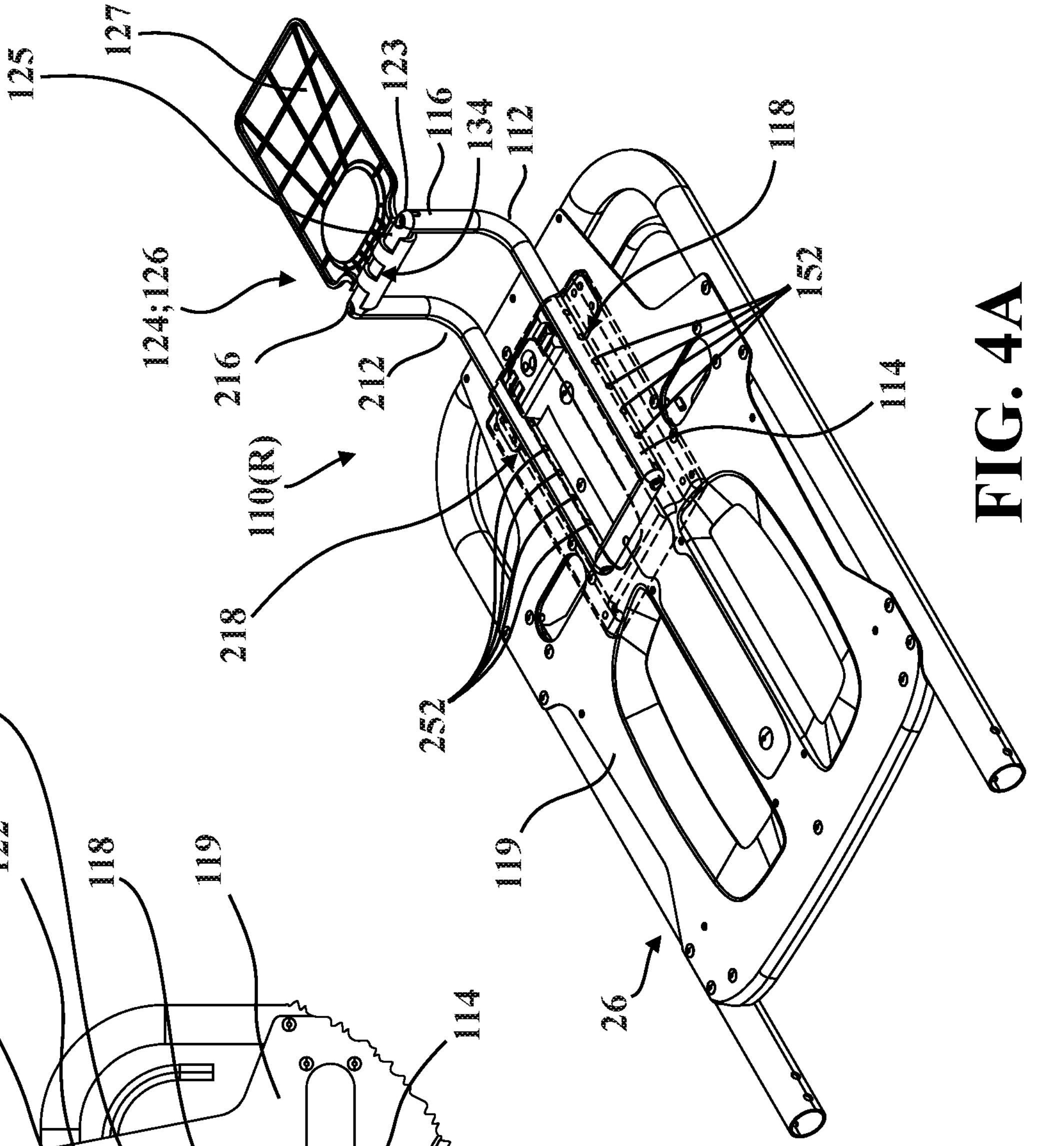
FIG. 4A is a perspective view of the deck extension assembly in the retracted configuration and the pivot coupling in a backward configuration.
Figure 4B:
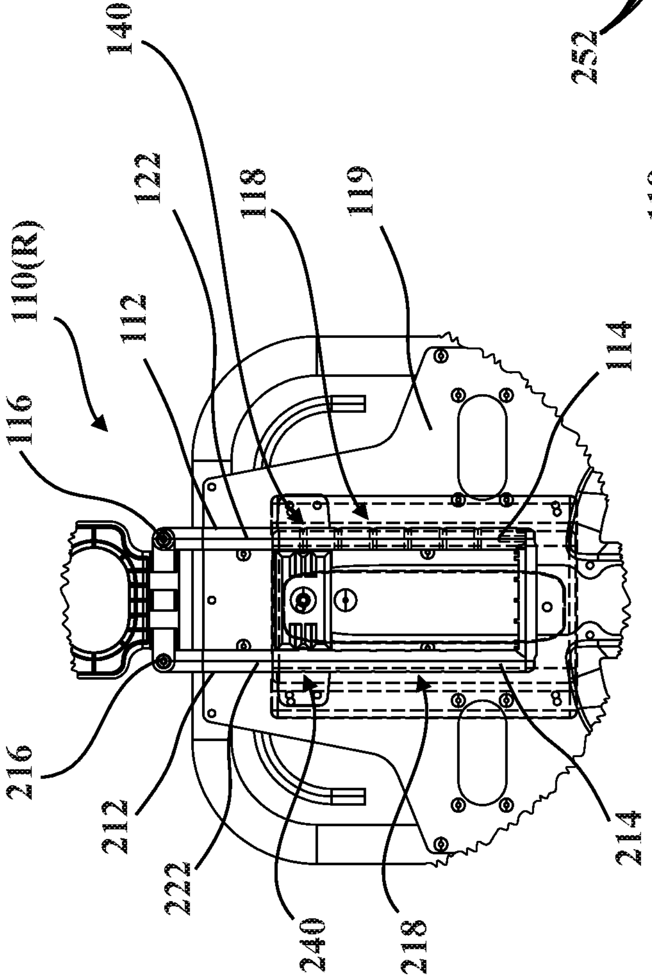
FIG. 4B is an enlarged partial top view of the deck extension assembly of FIG. 4A.
Figure 5:
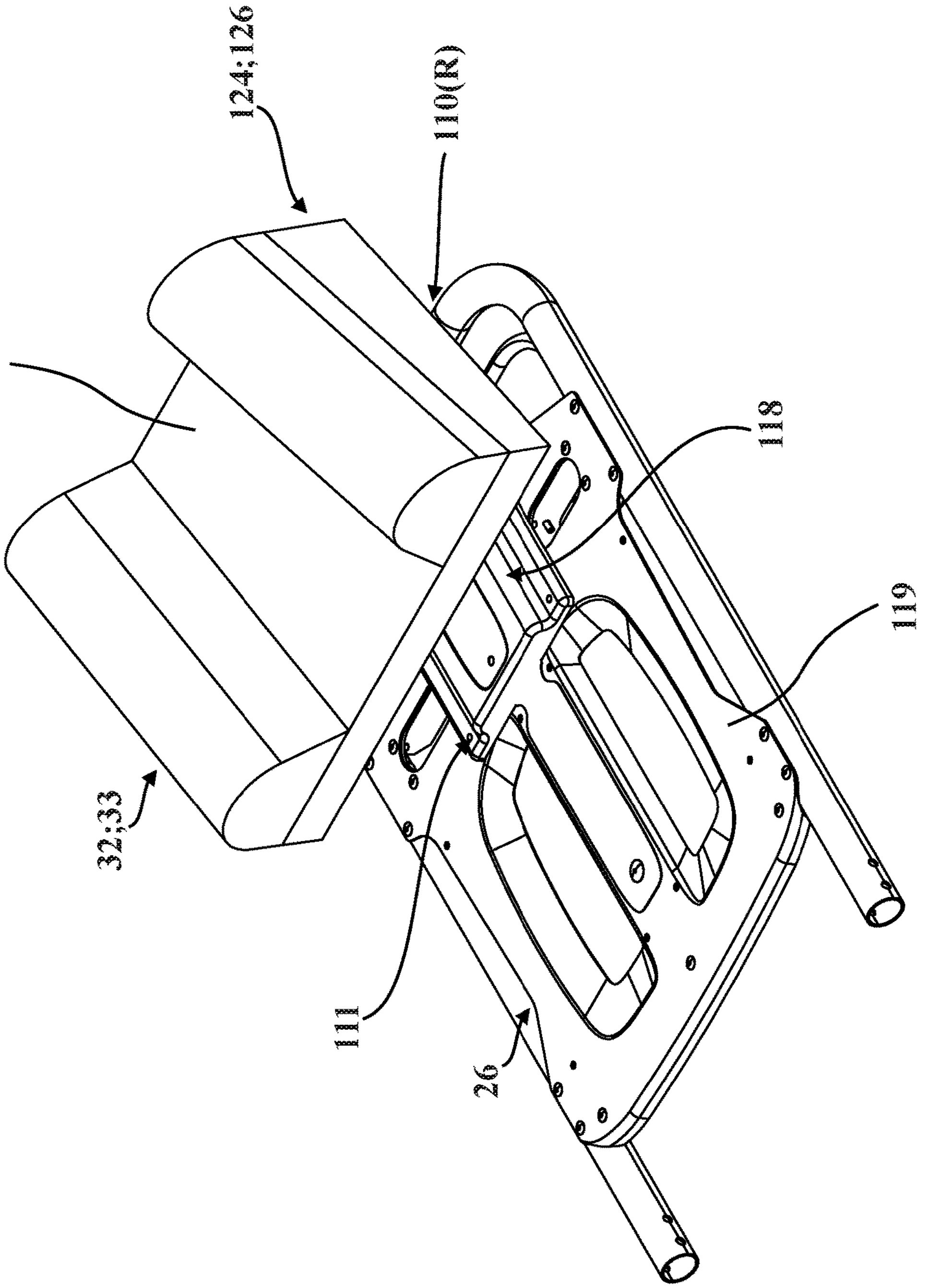
FIG. 5 is a perspective view of the deck extension assembly in the retracted configuration including a head deck section and the pivot coupling in a headrest configuration.

Referring to FIGS. 4A-4B, the patient transport apparatus 20 may further include a deck extension assembly 110 according to versions of the present disclosure. The deck extension assembly 110 provides adjustable extension to the patient support deck 24, as described in greater detail below. In some versions, the deck extension assembly 110 could provide extension for other deck sections, such as the leg deck section 30 or a foot deck section (not shown). FIGS. 4A-4B show the deck extension assembly 110 coupled to an end of the fowler deck section 26. However, any suitable coupling location to facilitate adjustable extension of a deck section is contemplated.

With continued reference to FIGS. 4A-4B, in the illustrated versions, the deck extension assembly 110 defines the head deck section 32, and generally includes a brace 112 extending between a mount end 114 and a coupling end 116, a pivot coupling 124 operatively attached to the coupling end 116 and supporting the head deck section 32 for selective pivoting movement relative to the brace 112, a mount 118 operatively attached to the fowler deck section and defining a receiver 120 slidably supporting the brace 112 adjacent to the mount end 114 for movement along a brace axis 122 between a plurality of extension positions 110E, 110R, and a retainer 140 interposed between the mount 118 and the brace 112 to selectively retain the brace 112 in one of the plurality of extension positions 110E, 110R. The retainer is operable between a retained configuration 142 (shown in FIGS. 9A-9D and 12A-12D) and a released configuration 144 (shown in FIGS. 10A-11D). In the retained configuration 142, the retainer 140 prevents relative movement between the mount 118 and the brace 112. In the released configuration 144, the retainer 140 permits movement of the brace 112 relative to the mount 118 between the plurality of extension positions 110E, 110R. The retainer 140 changes from the retained configuration 142 to the released configuration 144 in response to force F applied to the head deck section 32 in a direction along the brace axis 122 (see FIGS. 9A-12D). Each of the components of the deck extension assembly 110 introduced above will be described in greater detail below.

As will be appreciated from the subsequent description below, the various components of the deck extension assembly 110 may be manufactured from various materials, of similar or different types to each other, such as from plastic, aluminum, steel, composite, the like, or a combination thereof. For example, in some versions, brace 112 may be formed at least partially from a metallic material (e.g., as a hollow, bent tube with a cylidrical profile), and the mount 118, the pivot coupling 124, and/or other components may be formed at least partially from a plastic material. However, other configurations are contemplated.

As noted above, the mount 118 is operatively attached to the fowler deck section 26 of the patient transport apparatus 20. More specifically, as shown in the examples illustrated in FIGS. 5-7, the mount 118 is coupled to a fowler patient support surface 119 of the fowler deck section 26 with fasteners 111 (not shown in detail). In some versions, the fasteners 111 may be realized by threaded fasteners, rivets, clips, and the like, and may also or alternatively include adhesives, hook-and-loop materials, and the like. Other configurations are contemplated. The mount 118 defines the receiver 120, which slidably supports the brace 112. More specifically, the receiver 120 receives the mount end 114 of the brace 112 such that the receiver slidably supports the brace 112 adjacent to the mount end 114 for movement along the brace axis 122 between the plurality of extension positions 110E, 110R. FIGS. 1 and 2 illustrate different extension positions 110E, 110R. For example, FIG. 1 shows the deck extension assembly 110 in an extended extension position 110E, while FIG. 2 shows the deck extension assembly 110 in a retracted extension position 110R, discussed in further detail below.

Figure 6:
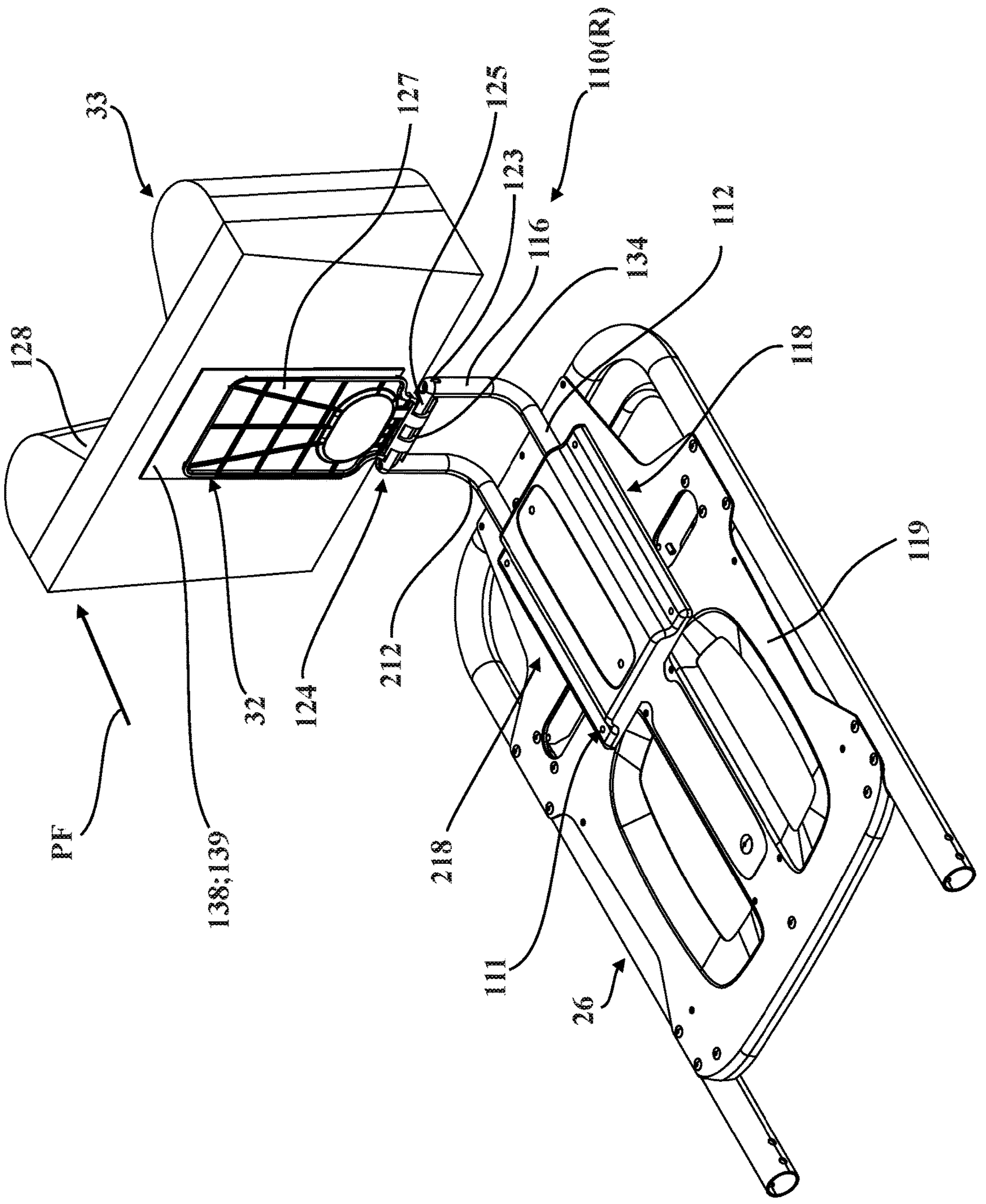
FIG. 6 is a perspective view of the deck extension assembly in the retracted configuration including the head deck section and the pivot coupling in an intermediate configuration.
Figure 7:
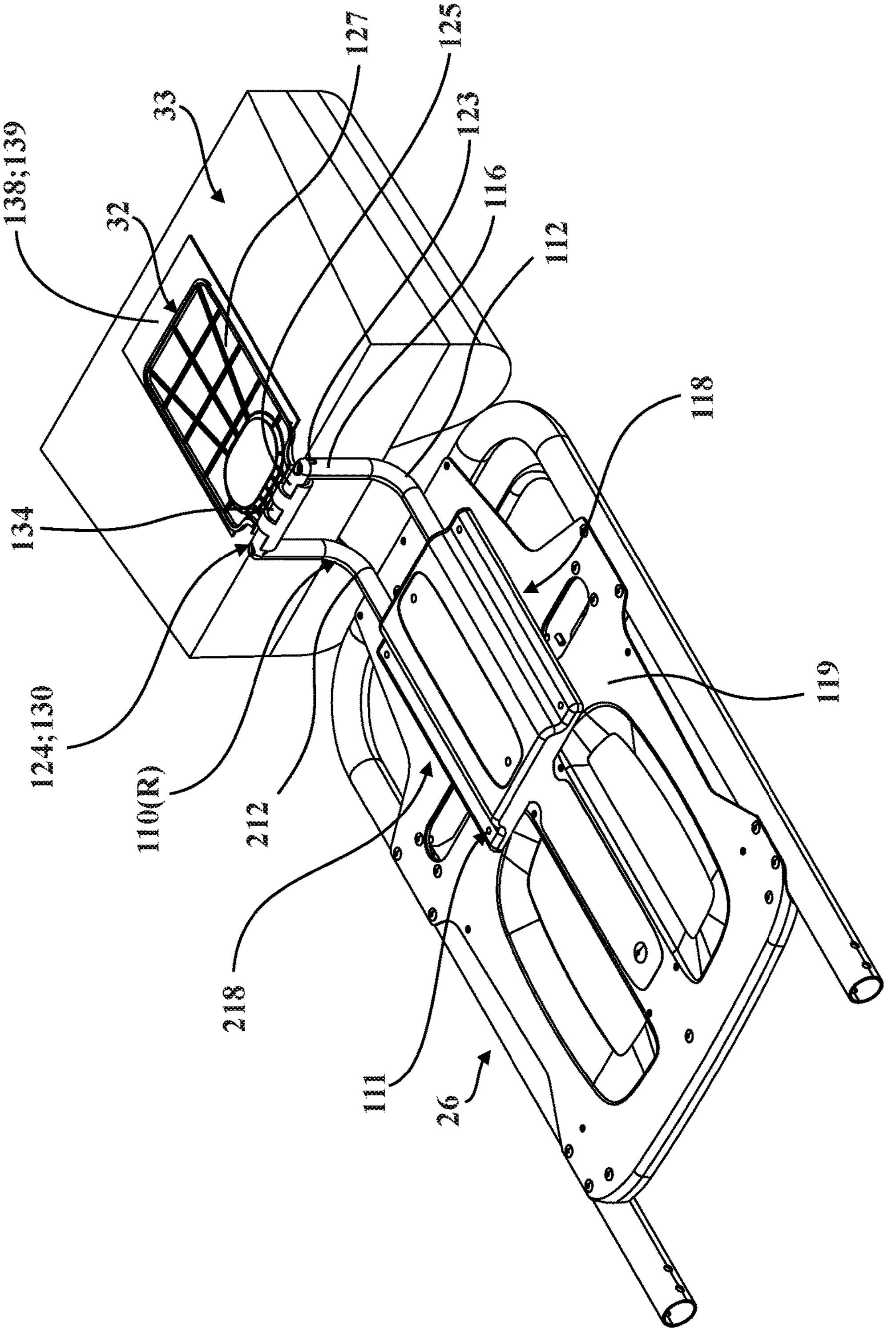
FIG. 7 is a perspective view of the deck extension assembly in the retracted configuration including the head deck section and the pivot coupling in a backward configuration.

As shown best in FIGS. 4A-4B, the pivot coupling 124 of the deck extension assembly 110 is operatively attached to the coupling end 116 of the brace 112 and is configured to support the head deck section 32 for selective pivoting movement relative to the brace 112. To this end, the pivot coupling 124 includes a pivot mount 123 which is received by the coupling end 116 of the brace 112 to operatively attach the pivot coupling 124 to the brace 112. Here, the pivot mount 123 and the coupling end 116 may have shapes or profiles which interlock or which otherwise correspond to each other, and may be attached via a snap-fit engagement, via fasteners, and the like (not shown in detail). The pivot coupling 124 also includes a pivot shaft 125 which supports a pivot plate 127 for movement. Here, referring to FIGS. 5-7, the pivot plate 127 of the pivot coupling 124 may be configured to move between a plurality of pivot configurations 126, 130, 132. The plurality of pivot configurations may include a headrest configuration 126 where the pivot coupling 124 is arranged with the pivot plate 127 positioned such that a patient head support surface 128 of the head deck section 32 is aligned with the patient support surface 25 to support a head of a patient (see FIG. 5). The plurality of pivot configurations may also include a backward configuration 130 where the pivot coupling 124 is arranged with the pivot plate 127 positioned such that the patient head support surface 128 of the head deck section 32 is arranged below the patient support surface 25 such that the head deck section 32 does not support a head of the patient (see FIG. 7). The plurality of pivot configurations may further include a plurality of intermediate configurations 132 between the headrest configuration 126 and the backward configuration 130. FIG. 6 depicts one intermediate configuration 132.

In some examples, the pivot coupling 124 includes a friction lock mechanism 134 interposed between the pivot shaft 125 and the pivot plate 127 The friction lock mechanism 134 may be configured to limit pivotal movement of the head deck section 32 relative to the brace 112 in response to a pivot input force PF applied to the head deck section 32 that is less than a pivot force threshold, while allowing pivotal movement of the head deck section 32 relative to the brace 112 in response to a pivot input force PF applied to the head deck section 32 that is greater than the pivot force threshold (see FIG. 6). In other words, if the pivot coupling 124 experiences a pivot input force PF (e.g., as applied by a caregiver) that results in a large enough pivot input torque about the pivot coupling 124 to overcome the friction of the friction lock mechanism 134, the friction lock mechanism 134 is configured to permit pivoting of the head deck section 32 relative to the brace 112 to allow the head deck section 32 to pivot between the plurality of pivot configurations.

Figure 8:
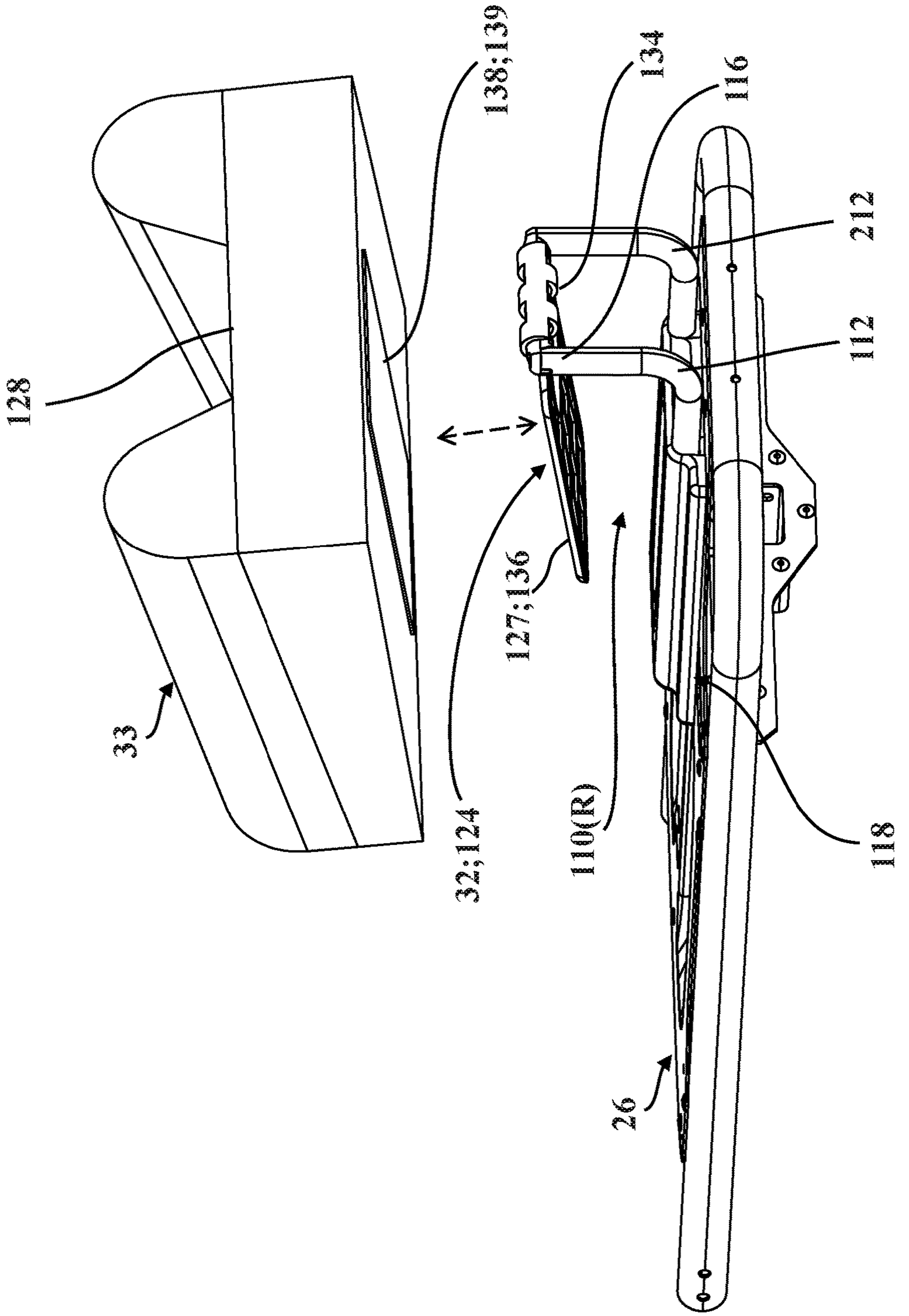
FIG. 8 is a perspective view of the deck extension assembly illustrating the coupling of the head deck section to the pivot coupling.
Figures 11A, 11B, 11C, 11D:
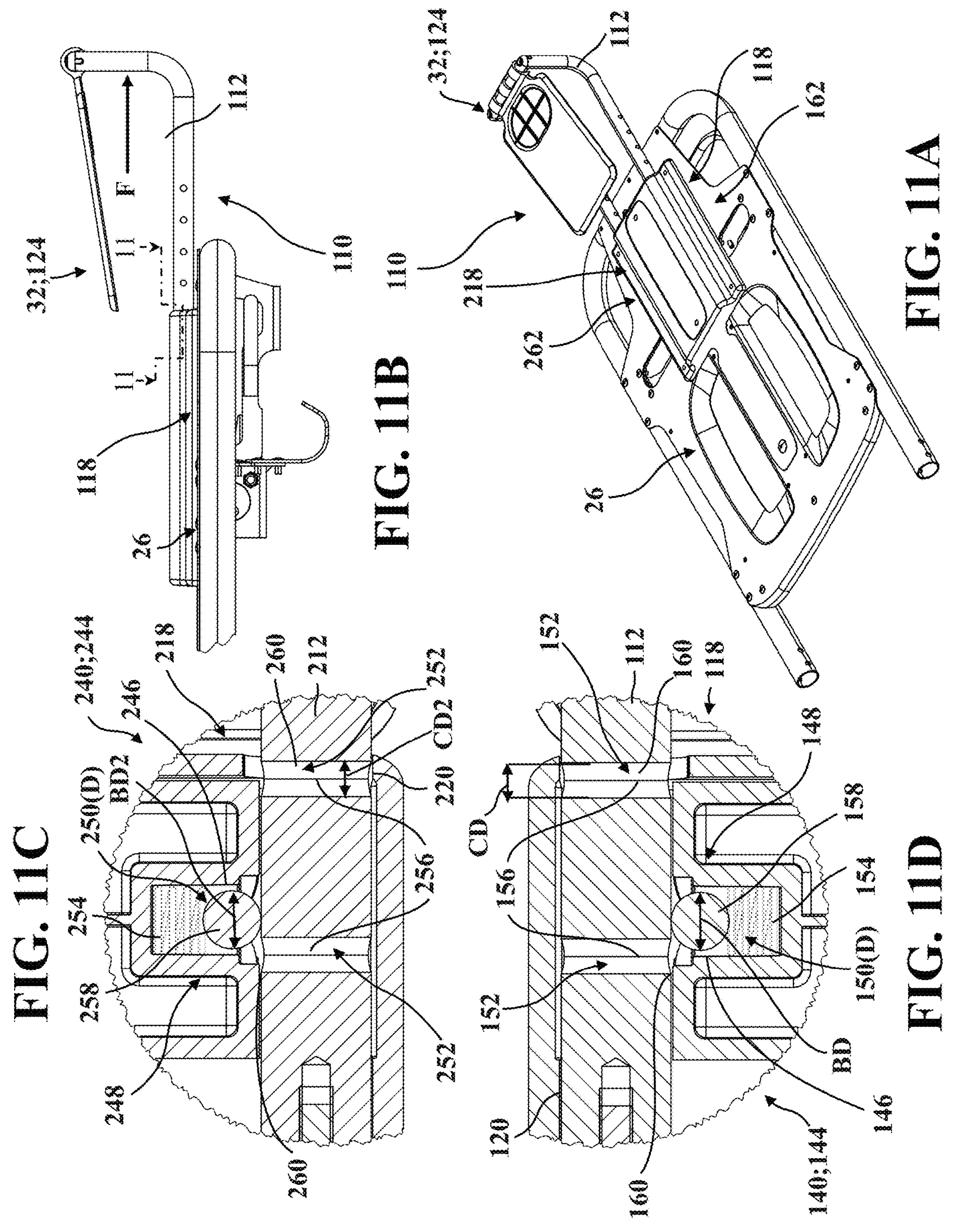
FIG. 11A is a perspective view of the deck extension assembly in another intermediate configuration.
FIG. 11B is a partial side view of the deck extension assembly of FIG. 11A.
FIG. 11C is a partial section view of the deck extension assembly of FIG. 11A that is sectioned to reveal a configuration of a second retainer in a second released configuration.
FIG. 11D is a partial section view of the deck extension assembly of FIG. 11A, taken along line 11-11 in FIG. 11B, that is sectioned to reveal a configuration of a first retainer in a first released configuration.
Figure 12B:
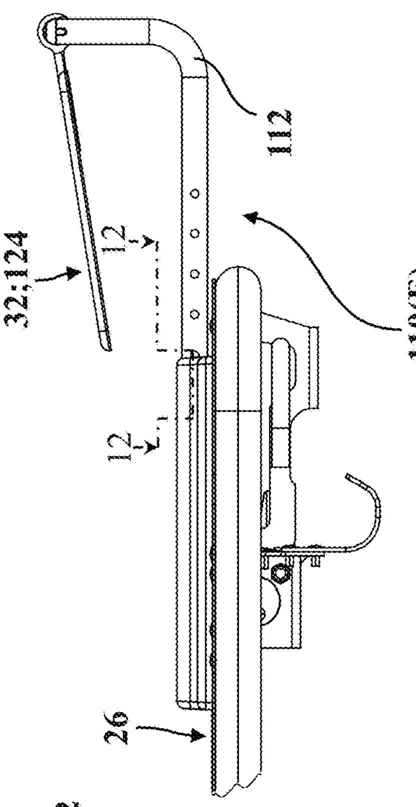
FIG. 12B is a partial side view of the deck extension assembly of FIG. 12A.
Figure 12A:
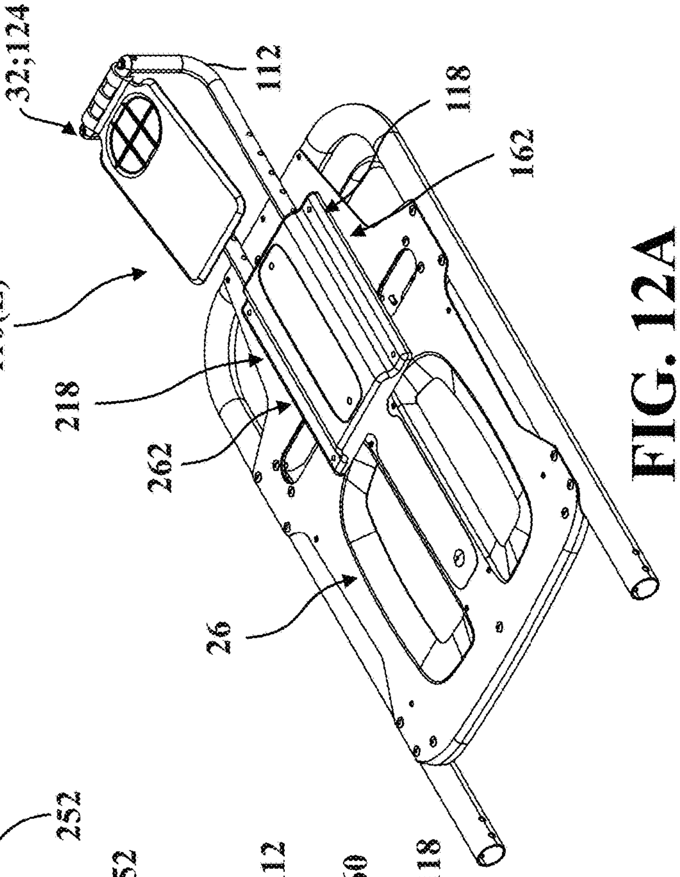
FIG. 12A is a perspective view of the deck extension assembly in an extended configuration.
Figure 12C:
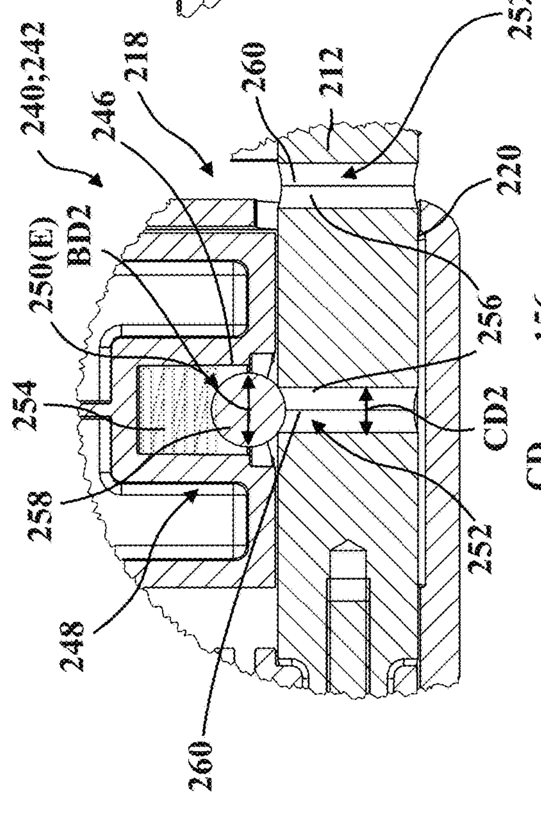
FIG. 12C is a partial section view of the deck extension assembly of FIG. 12A that is sectioned to reveal a configuration of a second retainer in a second retained configuration.
Figure 12D:
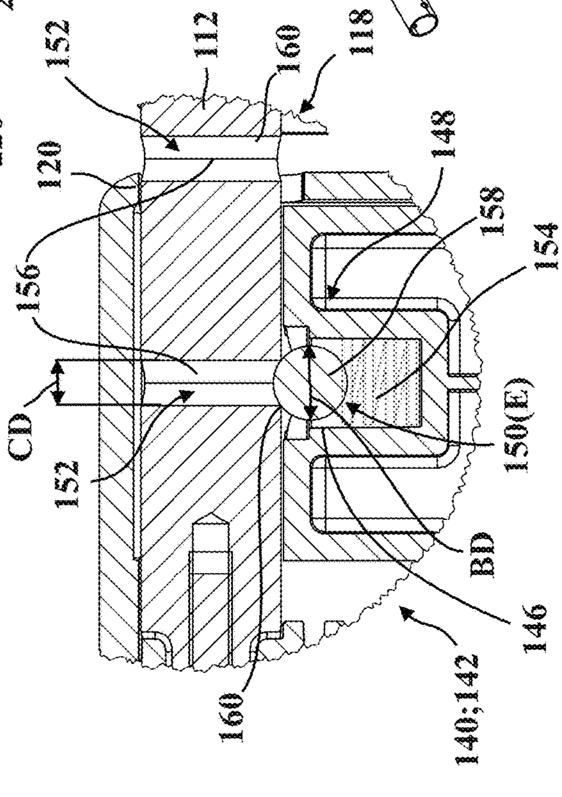
FIG. 12D is a partial section view of the deck extension assembly of FIG. 12A, taken along line 12-12 in FIG. 12B, that is sectioned to reveal a configuration of a first retainer in a first retained configuration.
Figure 13:
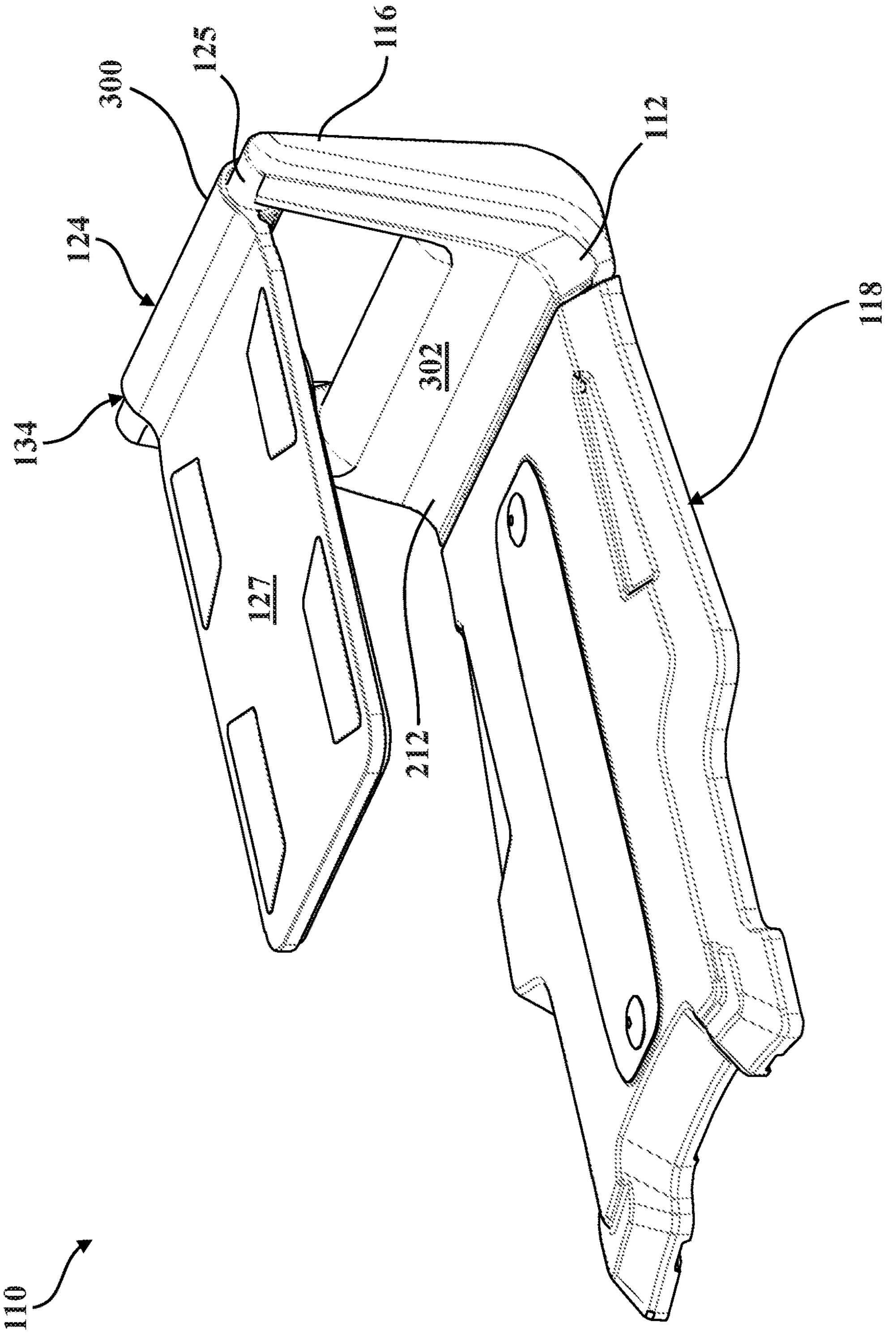
FIG. 13 is a perspective view of another version of the deck extension assembly of FIGS. 1-3.
Figure 14:
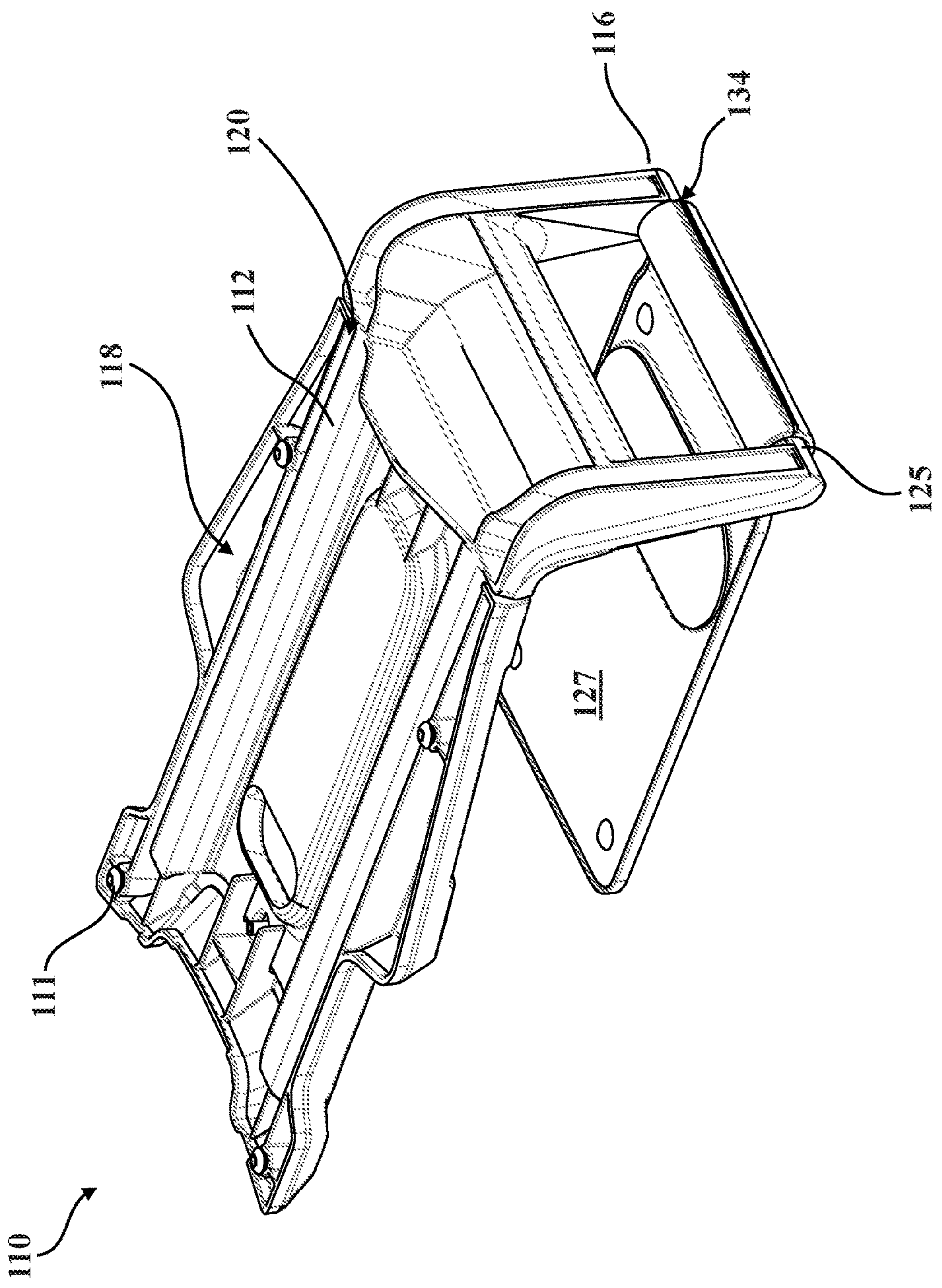
FIG. 14 is another perspective view of the deck extension assembly of FIG. 13.

It will be appreciated that the head deck section 32 may be coupled to the pivot coupling 124 in various ways. For example, the head deck section 32 may be coupled to the pivot coupling 124 via one or more fasteners, rivets, adhesives, snaps, buttons, hook-and-loop fasteners, and the like. For example, as shown in FIG. 8, the pivot plate 127 of the pivot coupling 124 may define a pivot coupling mounting surface 136. Similarly, the head deck section 32 may define a head deck mounting surface 138. In some examples, a hook-and-loop fastener 139 may be arranged on or otherwise between the pivot coupling mounting surface 136 and the head deck mounting surface 138 to couple the pivot coupling mounting surface 136 and the head deck mounting surface 138 together, thereby securing the head deck section 32 to the pivot coupling 124.

Referring now to FIGS. 9A-12D, the retainer 140 of the deck extension assembly 110 is interposed between the mount 118 and the brace 112 to selectively retain the brace 112 in one of the plurality of extension positions 110E, 110R. For example, the retainer 140 may be operable between a retained configuration 142 (shown in FIGS. 9A-9D and 12A-12D) and a released configuration 144 (shown in FIGS. 10A-11D). In the retained configuration 142, the retainer 140 prevents or otherwise inhibits relative movement between the mount 118 and the brace 112 within the receiver 120. In the released configuration 144, the retainer 140 permits movement of the brace 112 relative to the mount 118. For example, as will be discussed further below, in the released configuration 144, the brace 112 may be capable of movement relative to the mount 118 between the plurality of extension positions 110E, 110R.

The retainer 140 changes from the retained configuration 142 to the released configuration in response to a force F applied to the head deck section 32 and/or to the brace 112 in a direction along the brace axis 122. In other words, if a caregiver or some other user desires to extend or retract the deck extension assembly 110 to move the head deck section 32 and the head cushion 33, the retainer 140 permits translation of the brace 112 relative to the mount 118 in response to a user pushing (or pulling) on the head deck section 32 and/or the brace 112 forward (or backward) along the brace axis 122. For example, FIGS. 9A-12D illustrate a sequence of the deck extension assembly 110 moving between the plurality of extension positions in response to the applied force F noted above. In FIGS. 9A-9D, the deck extension assembly 110 is in the retracted extension position 110R and the retainer 140 is in the retained configuration 142. Next, in FIGS. 10A-10D, the retainer 140 changes to the released configuration 144 in response to the force F being applied to the brace 112. As a result, the deck extension assembly 110 is free to translate from the retracted extension position 110R towards one of the extended extension positions 110E or otherwise between the extension positions 110E, 110R. FIGS. 10A-11D show a sequence of the retainer 140 moving from the released configuration 144 to the retained configuration 142 as the deck extension assembly 110 reaches the extended extension position 110E. In FIGS. 10A-10D, the retainer 140 is in the released configuration 144 and still experiencing the force F that is translating the brace 112 relative to the mount. In FIGS. 11A-11D, the deck extension assembly 110 reaches a fully extended extension position 110E, and the retainer 140 moves from the released configuration 144 to the retained configuration 142, thereby preventing relative movement between the brace 112 and the mount 118.

The retainer 140 may be configured in various ways to limit movement of the brace 112 relative to the mount 118. For example, referring to FIGS. 9A-12D, the mount 118 may define a detent channel 146 (see FIGS. 9D, 10D, 11D, and 12D) and the retainer 140 may include a detent mechanism 148. The detent mechanism 148 may include a latch 150. The latch 150 may be arranged for movement along the detent channel 146 between an engaged position 150E and a disengaged position 150D. The retainer 140 may further include a plurality of catches 152 defined by the brace 112. The plurality of catches 152 may be arranged in a spaced relation along the brace axis 122 to define the plurality of extension positions. Referring to FIGS. 9A-9D, the latch 150 and the plurality of catches 152 may be arranged such that contact between the latch 150 and one of the plurality of catches 152 places the retainer 140 in the retained configuration 142 to limit relative movement between the mount 118 and the brace 112. In other words, when one of the plurality of the catches 152 is aligned with the latch 150, the latch 150 is configured to move from the disengaged position 150D to the engaged position 150E such that the latch 150 contacts the one of the plurality of catches 152 to limit relative movement between the mount 118 and the brace 112. Conversely, the latch 150 is configured to move from the engaged position 150E to the disengaged position 150D to place the retainer 140 in the released configuration 144 in response to the force F being applied to the head deck section 32 and/or the brace 112 in a direction along the brace axis 122.

In some versions, the detent mechanism 148 may further include a latch biasing mechanism 154 arranged to urge the latch 150 toward the engaged position 150E. Thus, when one of the plurality of catches 152 is aligned with the latch 150, the latch 150 is urged towards the engaged position 150E to place the retainer 140 in the retained configuration 142 to limit movement of the brace 112 relative to the mount 118. In other words, when one of the plurality of catches 152 is aligned with the latch 150, the latch 150 is automatically moved to the engaged position 150E to limit movement of the brace 112 relative to the mount 118. It will be appreciated that the latch biasing mechanism 154 is configured exert a biasing force sufficient to urge the latch 150 into the engaged position 150E, but also so as to allow the latch to move to the disengaged position 150D in response to the force F being exerted on the head deck section and/or the brace 112 to allow the retainer 140 to move into the released configuration 144. The latch biasing mechanism 154 may be configured or otherwise arranged in various ways to urge the latch 150 to the engaged position 150E. In some versions, the latch biasing mechanism 154 may include a compression spring. Other configurations are contemplated.

The plurality of catches 152 and the latch 150 may employ corresponding geometries that facilitate engagement of the latch 150 with one of the plurality of catches 152 to limit movement of the brace 112 relative to the mount 118. In other words, the latch 150 is shaped and sized such that the latch 150 may be received by one of the plurality of catches 152 to limit movement axial movement of the brace 112 relative to the mount 118 along the brace axis 122. For example, referring to FIGS. 9A-12D, the plurality of catches 152 may be defined by a plurality of catch apertures 156 arranged transverse to the brace axis 122. Correspondingly, the latch 150 may be realized as a ball 158 having a ball diameter BD. Here, the plurality of catch apertures 156 may each have a catch aperture diameter CD and define a catch aperture rim 160. In some examples, the catch aperture diameter CD is smaller than the ball diameter BD such that the ball 158 abuts the catch aperture rim 160 of one of the plurality of catch apertures 156 when the ball 158 is aligned with one of the plurality of catch apertures 156 and in the engaged position 150E to limit relative movement between the mount 118 and the brace 112 along the brace axis 122.

With reference to FIG. 4A-12D, in addition to the first brace 112 and the first mount 118, the deck extension assembly 110 may include a second brace 212 and a second mount 218 to provide further support and stability to the deck extension assembly 110. Similar to the first brace 112, the second brace 212 may extend between a second mount end 214 and a second coupling end 216 and define a second brace axis 222. Also similar to the first mount 118, the second mount 218 may be operatively attached to the fowler deck section 26 of the patient transport apparatus 20. Particularly, the first mount 118 may be operatively attached to a first lateral portion 162 of the fowler deck section 26, while the second mount 218 may be operatively attached to a second lateral portion 262 of the fowler deck section 26. The first lateral portion 162 may be one side of the fowler deck section 26 and the second lateral portion 262 may be the opposite side of the fowler deck section 26.

Similar to the first receiver 120 of the first mount 118, the second mount 218 may define a second receiver 220. The second receiver 220 may be configured to slidably support the second brace 212. For example, the second receiver 220 may be configured to receive the second mount end 214 of the second brace 212 such that the second receiver 220 slidably supports the second brace 212 adjacent to the second mount end 214 for movement along a second brace axis 222.

Similar to the first retainer 140, the deck extension assembly 110 may further include a second retainer 240. The second retainer 240 may be interposed between the second mount 218 and the second brace 212 to selectively retain the second brace 212. For example, the second retainer 240 may be operable between a second retained configuration 242 (shown in FIGS. 9A-9D and 12A-12D) and a second released configuration 244 (shown in FIGS. 10A-11D). In the second retained configuration 242, the second retainer 240 may be configured to prevent relative movement between the second mount 218 and the second brace 212 within the second receiver 220. In the second released configuration 244, the second retainer 240 may be configured to permit movement of the second brace 212 relative to the second mount 218. Similarly, operation of the first retainer 140 and the second retainer 240 changes from the first and second retained configurations 142, 242, respectively, to the first and second released configurations 144, 244, respectively, in response to the force F applied to the head deck section 32 and or one of the first and second braces first brace 112, 212 in a direction along the first and second brace axes 122, 222.

Further, similar to the description above, the second mount 218 may define a second detent channel 246 (see FIGS. 9C, 10C, 11C, and 12C) and the second retainer 240 may include a second detent mechanism 248. The second detent mechanism 248 may include a second latch 250. The second latch 250 may be arranged for movement along the second detent channel 246 between a second engaged position 250E and a second disengaged position 250D. The retainer 240 may further include a second plurality of catches 252 defined by the second brace 212. The second plurality of catches 252 may be arranged in a spaced relation along the second brace axis 222. Similar to the first detent mechanism 148 (described above), contact between the second latch 250 and one of the second plurality of catches 252 places the second retainer 240 in the second retained configuration 242 to limit relative movement between the second mount 218 and the second brace 212 along the second brace axis 222.

In some versions, the first detent mechanism 148 may be aligned with the second detent mechanism 248 such that the first retainer 140 and the second retainer 140 are simultaneously in one of the first and second retained configurations 142, 242, respectively, or the first and second released configurations 144, 244, respectively, as shown in FIGS. 9A-12D. Consequently, in some examples, the second plurality of catches 252 may be defined by the second brace 212 such that the second plurality of catches 252 are aligned with the first plurality of catches 152 defined by the first brace 112. Therefore, in some examples, the first latch 150 and the second latch 250 are configured to move to the first disengaged position 150D and the second disengaged position 250D, respectively, to move the first retainer 140 and the second retainer 240 to the first released configuration 144 and the second released configuration 244, respectively, in response to the force F applied to the head deck section 32 in a direction along the first and second brace axes 122, 222.

Similar to the first plurality of catches 152 and the first latch 150, the second plurality of catches 252 and the second latch 250 may be configured in various ways to facilitate engagement of the second latch 250 with one of the second plurality of catches 252 to limit movement of the second brace 212 relative to the second mount 218. In other words, the second latch 250 may likewise be shaped and sized such that the second latch 250 may be received by one of the second plurality of catches 252 to limit movement axial movement of the second brace 212 relative to the second mount 218 along the second brace axis 222. For example, referring to FIGS. 9A-12D, the second plurality of catches 252 may be defined by a second plurality of catch apertures 256 arranged transverse to the second brace axis 222. Correspondingly, the second latch 250 may be a second ball 258 having a second ball diameter BD2. The second plurality of catch apertures 256 may each have a second catch aperture diameter CD2 and define a second catch aperture rim 260. In some examples, the second catch aperture diameter CD2 is smaller than the second ball diameter BD2 such that the second ball 258 abuts the second catch aperture rim 260 of one of the second plurality of catch apertures 256 when the second ball 258 is aligned with one of the second plurality of catch apertures 256 and in the second engaged position 250E to limit relative movement between the second mount 218 and the second brace 212 along the second brace axis 222.

Additionally, similar to the first detent mechanism 148, the second detent mechanism 248 may further include a second latch biasing mechanism 254. The second latch biasing mechanism 254 may be configured to urge the second latch 250 toward the second engaged position 250E. Thus, when one of the second plurality of catches 252 is aligned with the second latch 250, the second latch 250 is placed in the second engaged position 250E to place the second retainer 240 in the second retained configuration 242 to limit movement of the second brace 212 relative to the second mount 218. In other words, when one of the second plurality of catches 252 is aligned with the second latch 250, the second latch 250 is automatically moved to the second engaged position 250E to limit movement of the second brace 212 relative to the second mount 218.

In some examples, such as shown in FIGS. 4-12D, the head deck section 32 may be operatively attached to the first coupling end 116 of the first brace 112 and the second coupling end 216 of the second brace 212. For example, similar to the description of the pivot coupling 124 above, the pivot coupling 124 may be configured to support the head deck section 32 for selective pivoting movement relative to the first brace 112 and the second brace 212. Here the pivot coupling 124 may extend between the first coupling end 116 of the first brace 112 and the second coupling end 216 of the second brace 212, and, as described above, the pivot coupling 124 may be configured to support the head deck section 32 for selective pivoting movement.

As noted above, another version of the deck extension assembly 110 is shown in FIGS. 13-17. Unless otherwise indicated, for the purposes of clarity and consistency, the components and structural features of the version of the deck extension assembly 110 described above (e.g., in connection with FIGS. 1-12D) that are the same as or that otherwise correspond to the version of the deck extension assembly 110 of FIGS. 13-17 are provided with the same reference numerals throughout the drawings and in the following description.

Referring to FIGS. 13-17, this version of the deck extension assembly 110 is similar to the version of the deck extension assembly 110 described above in connection with FIGS. 1-12D. While the specific differences will be described in greater detail below, here too in this version the deck extension assembly 110 may be attached to the patient transport apparatus 20 (e.g., to the fowler deck section 26), and employs the brace 112 extending between the mount end 114 and the coupling end 116. Here in this version, however, the pivot coupling 124 is configured differently, whereby the pivot shaft 125 is formed together with the brace 112 as a unitary component that is slidably received by the receiver 120 of the mount 118. Put differently, in this version there is no pivot mount 123 that is received within the coupling end 116 of the mount 118 because the pivot shaft 125 itself is formed as a portion of the mount 118 adjacent to the coupling end 116. Here too in this version, the pivot plate 127 of the pivot coupling 124 is realized with a clamshell configuration and defines a hinge mount 300 to facilitate assembly, whereby the hinge mount 300 can be positioned around the pivot shaft 125 and the clamshell configuration of the pivot plate 127 can be brought together and bonded (e.g., via ultrasonic welding, adhesives, fasteners, and the like) to secure the pivot plate 127 about the pivot shaft 125 and thereby define the friction lock mechanism 134.

Figure 15:
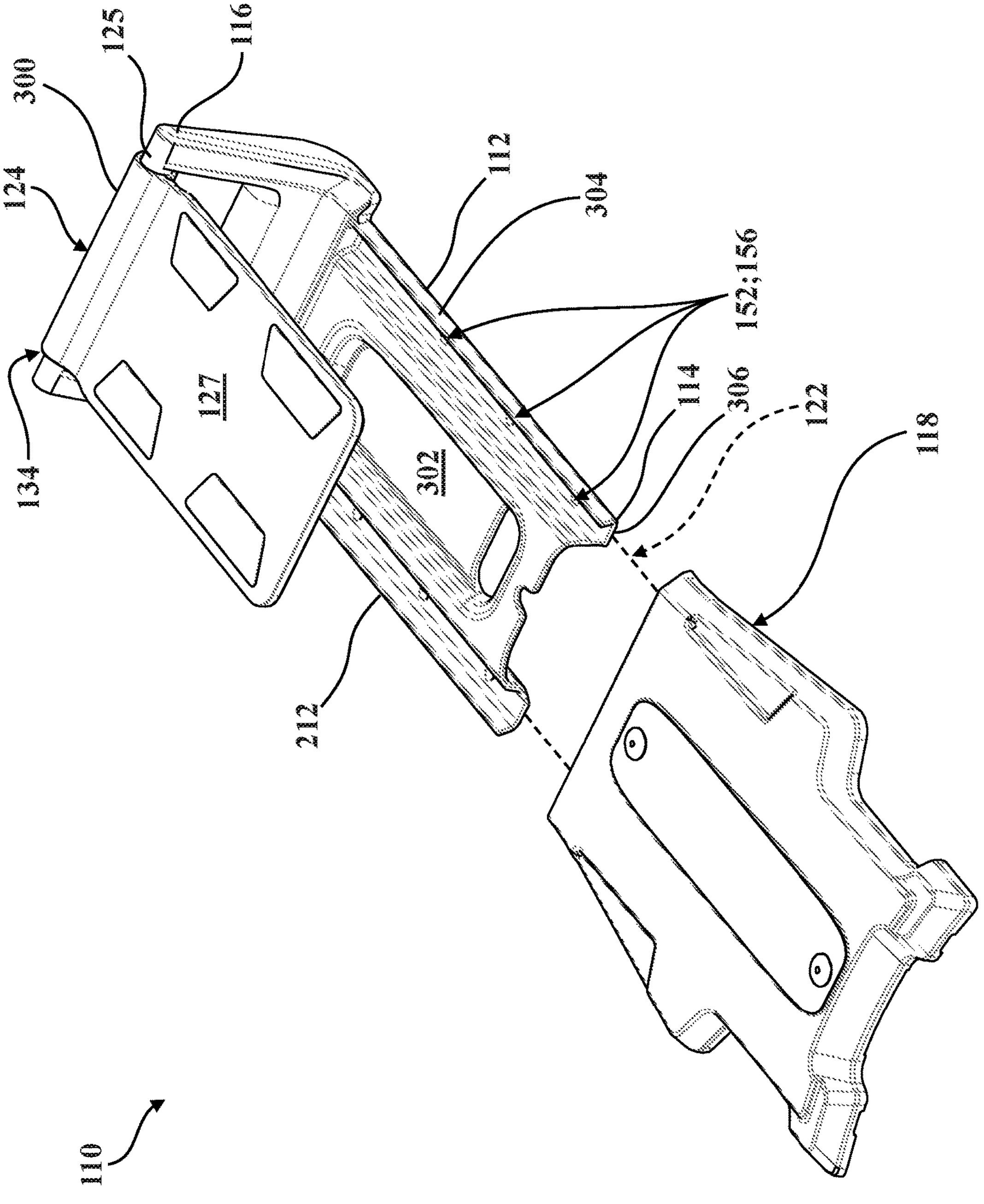
FIG. 15 is a partially-exploded perspective view of the deck extension assembly of FIGS. 13-14.
Figure 16:
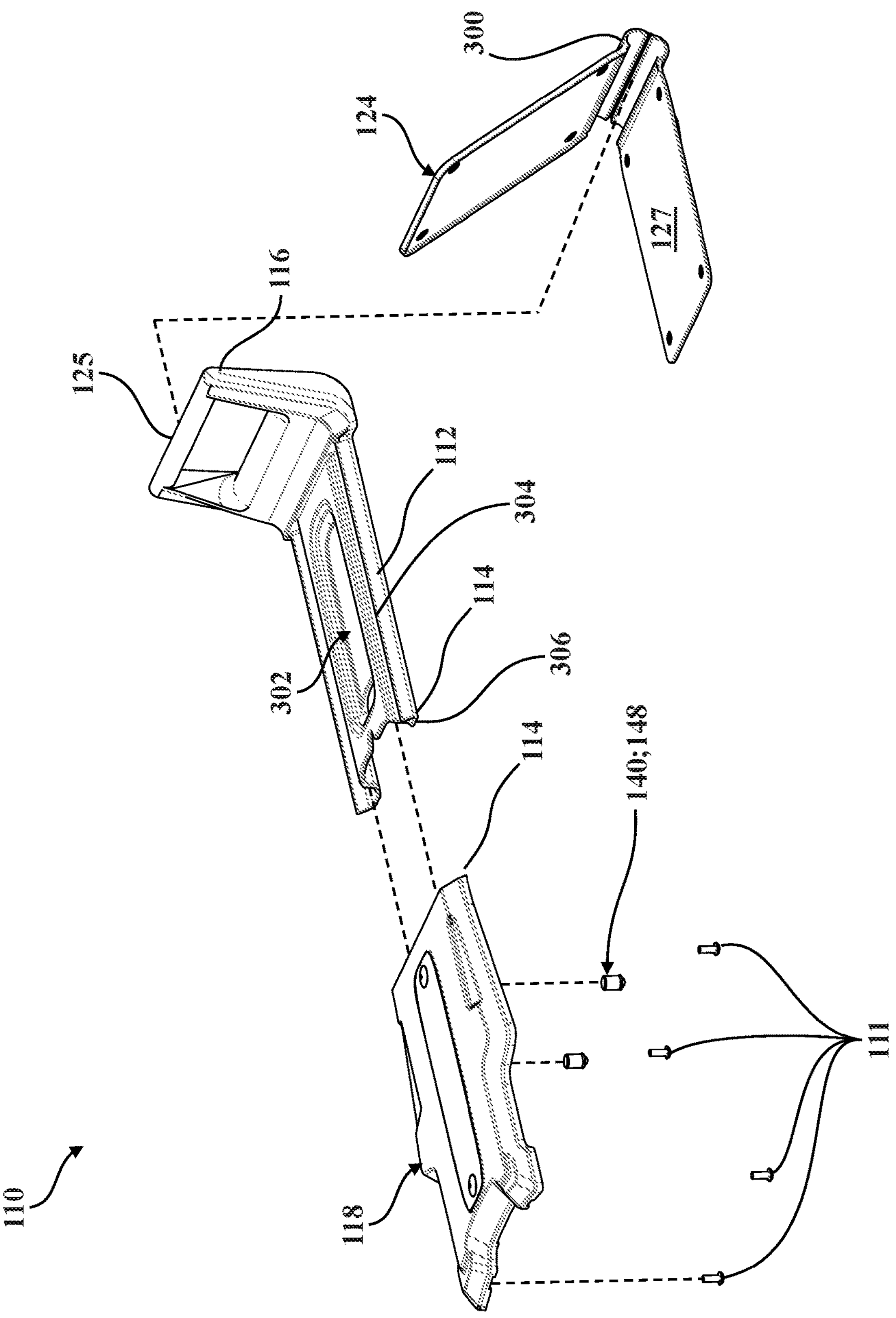
FIG. 16 is an exploded perspective view of the deck extension assembly of FIGS. 13-15.
Figure 17:
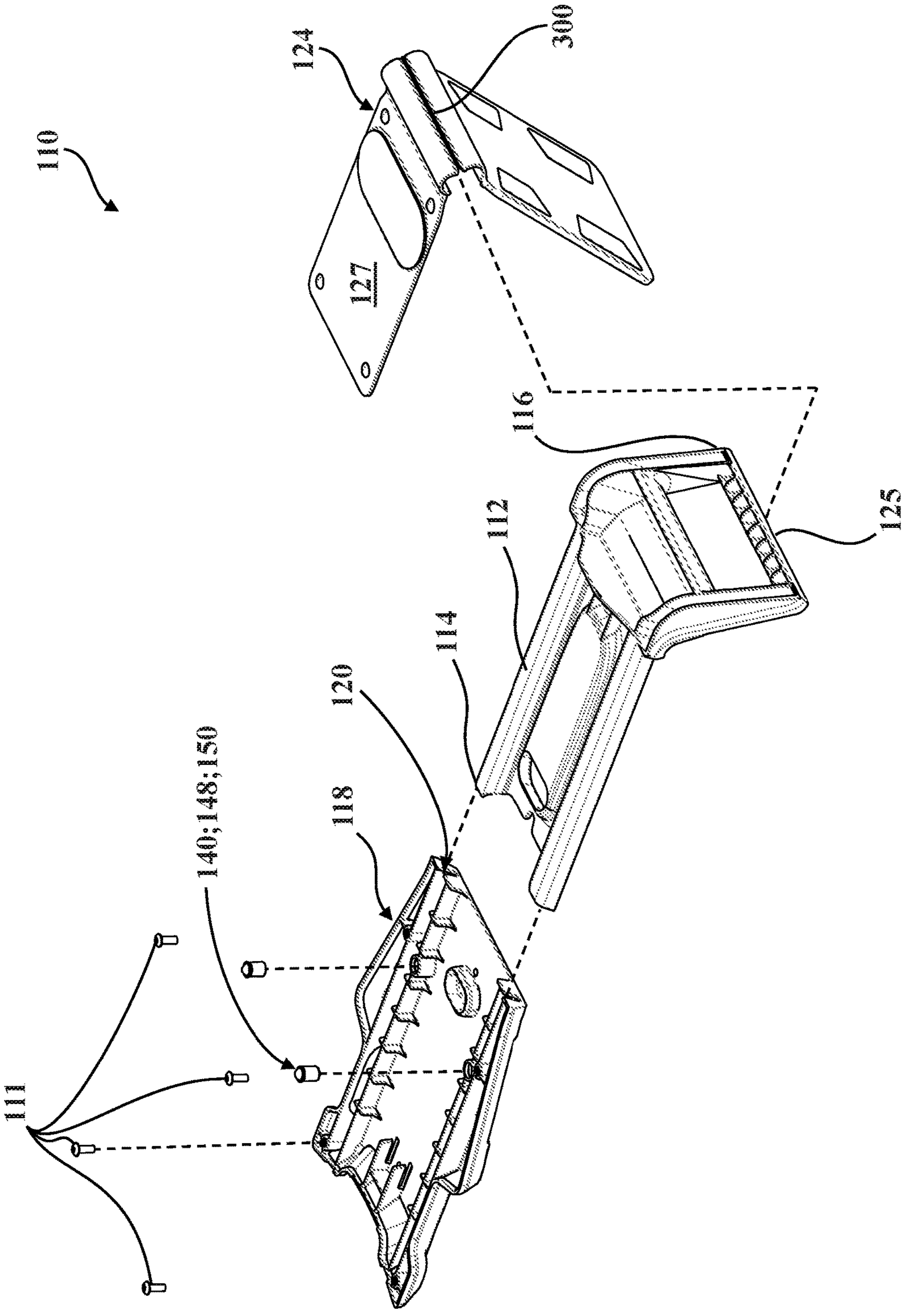
FIG. 17 is another exploded perspective view of the deck extension assembly of FIGS. 13-16.

As is best depicted in FIGS. 15-16, in this version the brace 112 and the second brace 212 are connected by a bridge 302 which extends laterally therebetween. For the purposes of brevity, the second brace 212 will not be described in detail for this version. The brace 112 has an angled, extruded profile defining a lip 304 which is slidably received by the mount 118, and a strut 306 extending between the lip 304 and the bridge 302. Here, the catches 152 are formed in the strut 306 and are spaced from each other along the brace axis 122 (see FIG. 15). In this version, the detent mechanism 148 of the retainer 140 is supported generally vertically by the mount 118 (as opposed to generally laterally as in the previous version).

It will be further appreciated that the terms “include,” “includes,” and “including” have the same meaning as the terms “comprise,” “comprises,” and “comprising.” Moreover, it will be appreciated that terms such as “first,” “second,” “third,” and the like are used herein to differentiate certain structural features and components for the non-limiting, illustrative purposes of clarity and consistency.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient transport apparatus comprising:
- a base;
- an intermediate frame;
- a patient support deck defining a patient support surface, the patient support deck including a fowler deck section operatively attached to the intermediate frame; and
- a deck extension assembly including:
  - a head deck section,
  - a brace extending between a mount end and a coupling end,
  - a pivot coupling operatively attached to the coupling end and supporting the head deck section for selective pivoting movement relative to the brace,
  - a mount operatively attached to a top support surface of the fowler deck section and defining a receiver slidably supporting the brace adjacent to the mount end for movement relative to the fowler deck section along a brace axis between a plurality of extension positions, and
  - a retainer interposed between the mount and the brace to selectively retain the brace in one of the plurality of extension positions, the retainer being operable between: a retained configuration to prevent relative movement between the mount and the brace, and a released configuration to permit movement of the brace relative to the mount between the plurality of extension positions, wherein operation of the retainer changes from the retained configuration to the released configuration in response to force applied to the head deck section in a direction along the brace axis.

2. The patient transport apparatus of claim 1, wherein the mount defines a detent channel, and the retainer comprises a detent mechanism, the detent mechanism including:

a latch arranged for movement along the detent channel between an engaged position and a disengaged position; and a plurality of catches defined by the brace and arranged in spaced relation along the brace axis to define the plurality of extension positions;

wherein contact between the latch and one of the plurality of catches places the retainer in the retained configuration to limit relative movement between the mount and the brace.

3. The patient transport apparatus of claim 2, wherein the detent mechanism further comprises a latch biasing mechanism configured to urge the latch toward the engaged position such that the latch moves to the engaged position to contact one of the plurality of catches when one of the plurality of catches is aligned with the latch to place the retainer in the retained configuration to limit relative movement between the mount and the brace.

4. The patient transport apparatus of claim 2, wherein the latch is configured to move to the disengaged position to place the retainer in the released configuration in response to force applied to the head deck section in a direction along the brace axis.

5. The patient transport apparatus of claim 2, wherein the plurality of catches are defined by a plurality of catch apertures arranged transverse to the brace axis.

6. The patient transport apparatus of claim 5, wherein the latch is a ball having a ball diameter and the plurality of catch apertures each have a catch aperture diameter and define a catch aperture rim; and wherein the catch aperture diameter is smaller than the ball diameter such that the ball abuts the catch aperture rim of one of the plurality of catch apertures when the ball is aligned with one of the plurality of catch apertures and in the engaged position to limit relative movement between the mount and the brace.

7. The patient transport apparatus of claim 1, wherein the pivot coupling is configured to move between a plurality of pivot configurations including:

a headrest configuration where the pivot coupling is positioned such that a patient head support surface of the head deck section is aligned with the patient support surface to support a head of a patient, and a backward configuration where the pivot coupling is positioned such that the patient head support surface of the head deck section is arranged below the patient support surface such that the head deck section does not support a head of the patient.

8. The patient transport apparatus of claim 1, wherein the pivot coupling includes a friction lock mechanism configured to:

limit pivotal movement of the head deck section relative to the brace in response to a pivot input force applied to the head deck section that is less than a pivot force threshold; and allow pivotal movement of the head deck section relative to the brace in response to a pivot input force applied to the head deck section that is greater than the pivot force threshold.

9. The patient transport apparatus of claim 1, wherein the pivot coupling is at least partially formed from a plastic material.

10. The patient transport apparatus of claim 1, wherein the pivot coupling defines a pivot coupling mounting surface and the head deck section defines a head deck mounting surface, wherein a hook and loop fastener is configured to couple the pivot coupling mounting surface to the head deck mounting surface to secure the head deck section to the pivot coupling.

11. The patient transport apparatus of claim 1, wherein the brace is at least partially formed from a metallic material.

12. The patient transport apparatus of claim 1, wherein the mount is coupled to a fowler patient support surface of the fowler deck section of the patient support deck.

13. A patient transport apparatus comprising:

a base;

an intermediate frame;

a patient support deck defining a patient support surface, the patient support deck including a fowler deck section operatively attached to the intermediate frame; and a deck extension assembly including:

a first brace extending between a first mount end and a first coupling end, a second brace extending between a second mount end and a second coupling end, a head deck section operatively attached to the first coupling end of the first brace and the second coupling end of the second brace, a first mount operatively attached to a top support surface of the fowler deck section at a first lateral portion of the fowler deck section and defining a first receiver slidably supporting the first brace adjacent to the first mount end for movement relative to the fowler deck section along a first brace axis between a plurality of extension positions, a second mount operatively attached to the top support surface of the fowler deck section at a second lateral portion of the fowler deck section, opposite the first lateral portion, and defining a second receiver slidably supporting the second brace adjacent to the second mount end for movement relative to the fowler deck section along a second brace axis, a first retainer interposed between the first mount and the first brace to selectively retain the first brace in one of the plurality of extension positions, the first retainer being operable between: a first retained configuration to prevent relative movement between the first mount and the first brace, and a first released configuration to permit movement of the first brace relative to the first mount between the plurality of extension positions, and a second retainer interposed between the second mount and the second brace to selectively retain the second brace, the second retainer being operable between: a second retained configuration to prevent relative movement between the second mount and the second brace, and a second released configuration to permit movement of the second brace relative to the second mount, wherein operation of the first retainer and the second retainer changes from the first and second retained configurations, respectively, to the first and second released configurations, respectively, in response to force applied to the head deck section in a direction along the first and second brace axes.

14. The patient transport apparatus of claim 13, wherein the first mount defines a first detent channel, and the first retainer comprises a first detent mechanism, the first detent mechanism including:

a first latch arranged for movement along the first detent channel between a first engaged position and a second disengaged position; and a first plurality of catches defined by the first brace and arranged in spaced relation along the first brace axis to define the plurality of extension positions;

wherein contact between the first latch and one of the first plurality of catches places the first retainer in the first retained configuration to limit relative movement between the first mount and the first brace.

15. The patient transport apparatus of claim 14, wherein the first detent mechanism further comprises a first latch biasing mechanism configured to urge the first latch toward the first engaged position such that the first latch moves to the first engaged position to contact one of the first plurality of catches when one of the first plurality of catches is aligned with the first latch to place the first retainer in the first retained configuration to limit relative movement between the first mount and the first brace.

16. The patient transport apparatus of claim 14, wherein the second mount defines a second detent channel, and the second retainer comprises a second detent mechanism, the second detent mechanism including:

a second latch arranged for movement along the second detent channel between a second engaged position and a second disengaged position; and a second plurality of catches defined by the second brace and arranged in spaced relation along the second brace axis;

wherein contact between the second latch and one of the second plurality of catches places the second retainer in the second retained configuration to limit relative movement between the second mount and the second brace.

17. The patient transport apparatus of claim 16, wherein the second detent mechanism further comprises a second latch biasing mechanism configured to urge the second latch toward the second engaged position such that the second latch moves to the second engaged position to contact one of the second plurality of catches when one of the second plurality of catches is aligned with the second latch to place the second retainer in the second retained configuration to limit relative movement between the second mount and the second brace.

18. The patient transport apparatus of claim 16, wherein the first latch and the second latch are configured to move to the first disengaged position and the second disengaged position, respectively, to move the first retainer and the second retainer to the first released configuration and the second released configuration, respectively, in response to force applied to the head deck section in a direction along the first and second brace axes.

19. The patient transport apparatus of claim 16, wherein the first detent mechanism is aligned with the second detent mechanism such that the first retainer and the second retainer are simultaneously in one of the first and second retained configurations, respectively, or the first and second released configurations, respectively.

20. The patient transport apparatus of claim 13, wherein the head deck section is operatively coupled the first brace and the second brace via a pivot coupling extending between the first coupling end of the first brace and the second coupling end of the second brace and configured to support the head deck section for selective pivoting movement relative to the first brace and the second brace.

* * * * *